(12) United States Patent
Henry

(10) Patent No.: US 11,451,023 B2
(45) Date of Patent: Sep. 20, 2022

(54) DISCONNECT SYSTEM FOR AN AUXILIARY SIDE RAMP FOR A MODULAR CABLE PROTECTOR

(71) Applicant: Stephen K. Henry, Billings, MT (US)

(72) Inventor: Stephen K. Henry, Billings, MT (US)

( * ) Notice: Subject to any disclaimer, the term of this patent is extended or adjusted under 35 U.S.C. 154(b) by 571 days.

(21) Appl. No.: 16/549,319

(22) Filed: Aug. 23, 2019

(65) Prior Publication Data

US 2020/0091693 A1 Mar. 19, 2020

Related U.S. Application Data

(60) Provisional application No. 62/732,147, filed on Sep. 17, 2018.

(51) Int. Cl.
*H02G 3/04* (2006.01)
*F16L 37/26* (2006.01)

(52) U.S. Cl.
CPC ............ *H02G 3/0437* (2013.01); *F16L 37/26* (2013.01)

(58) Field of Classification Search
CPC ............ H02G 9/025; H02G 9/02; H02G 9/04; H02G 3/0418; H02G 3/0487; H02G 3/34; H02G 15/08; H02G 9/00; H02G 9/065; H02G 3/0437; H02G 3/0608; H02G 3/185; H02G 3/06; H01B 7/0045; H01B 13/012
USPC .......... 174/72 A, 68.1, 651, 66, 97, 57, 496, 174/377, 559, 495
See application file for complete search history.

(56) References Cited

U.S. PATENT DOCUMENTS

| | | | | |
|---|---|---|---|---|
| 3,888,186 A | * | 6/1975 | Jentzsch | H02G 9/065 |
| | | | | 104/275 |
| 5,095,822 A | * | 3/1992 | Martin | H02G 9/04 |
| | | | | 174/101 |
| 5,123,776 A | | 6/1992 | Lang et al. | |
| 5,566,622 A | | 10/1996 | Ziaylek et al. | |
| 5,745,975 A | * | 5/1998 | Heisner | H01R 43/28 |
| | | | | 29/564.6 |

(Continued)

FOREIGN PATENT DOCUMENTS

| CN | 203807909 | | 9/2014 |
|---|---|---|---|
| DE | 202014102976 | U1 | 7/2014 |

(Continued)

OTHER PUBLICATIONS

Search Report and Written Opinion in PCT/US19/49950, 10 pages, dated Dec. 5, 2019.

*Primary Examiner* — Krystal Robinson
(74) *Attorney, Agent, or Firm* — Cochran Freund & Young, LLC

(57) ABSTRACT

An auxiliary side ramp for use with modular cable protectors includes a number of tool engagement features. A tool can be used to removably engage these tool engagement features and allows a user to exert an upward force to disengage the edge connectors on adjacent auxiliary side ramps, and also disengage the auxiliary side ramp from the underlying cable protector. For example, the tool engagement features can be slots in the top surface of the auxiliary side ramp with undercuts adjacent to the lower ends of the slots. A tool with vertical rods is manually inserted into the slots to disengage the cable protectors. Horizontal projections at the bottom of the vertical rods engage the undercuts in the slots, and allow the user to disengage adjacent auxiliary side ramps by lifting upward on the tool.

17 Claims, 21 Drawing Sheets

(56) References Cited

U.S. PATENT DOCUMENTS

| | | | | |
|---|---|---|---|---|
| 5,777,266 A * | 7/1998 | Herman | | H02G 9/04 138/155 |
| D412,490 S | 8/1999 | Henry | | |
| 6,202,565 B1 | 3/2001 | Henry | | |
| 6,481,036 B1 * | 11/2002 | Duvall | | H02G 9/04 414/921 |
| 6,499,410 B1 | 12/2002 | Berardi | | |
| 6,747,212 B1 * | 6/2004 | Henry | | H02G 3/283 174/101 |
| 6,878,881 B1 * | 4/2005 | Henry | | H02G 9/04 174/101 |
| 7,145,078 B2 * | 12/2006 | Henry | | H02G 9/04 174/101 |
| 7,145,079 B1 | 12/2006 | Henry | | |
| 7,309,836 B2 * | 12/2007 | Lubanski | | H02G 9/04 174/101 |
| 8,001,643 B1 * | 8/2011 | James | | H02G 9/04 174/101 |
| 8,119,914 B2 * | 2/2012 | Lubanski | | H02G 9/025 174/101 |
| 8,309,850 B2 | 11/2012 | Henry | | |
| 8,434,739 B1 | 5/2013 | Connolly | | |
| 8,791,363 B2 | 7/2014 | Lubanski | | |
| D717,248 S | 11/2014 | Coffman | | |
| 9,059,574 B2 | 6/2015 | Coffman et al. | | |
| 9,103,075 B2 | 8/2015 | Kaylor et al. | | |
| 9,438,022 B2 | 9/2016 | Lioi | | |
| 10,047,493 B2 | 8/2018 | Johnson | | |
| 2014/0311048 A1 | 10/2014 | Hill et al. | | |
| 2016/0023873 A1 | 1/2016 | Kasan | | |
| 2016/0365715 A1 | 12/2016 | Coffman et al. | | |
| 2019/0052071 A1 * | 2/2019 | Henry | | B66F 15/00 |

FOREIGN PATENT DOCUMENTS

| | | |
|---|---|---|
| FR | 2943077 A1 | 9/2010 |
| WO | WO 2016/153734 A1 | 9/2016 |

* cited by examiner

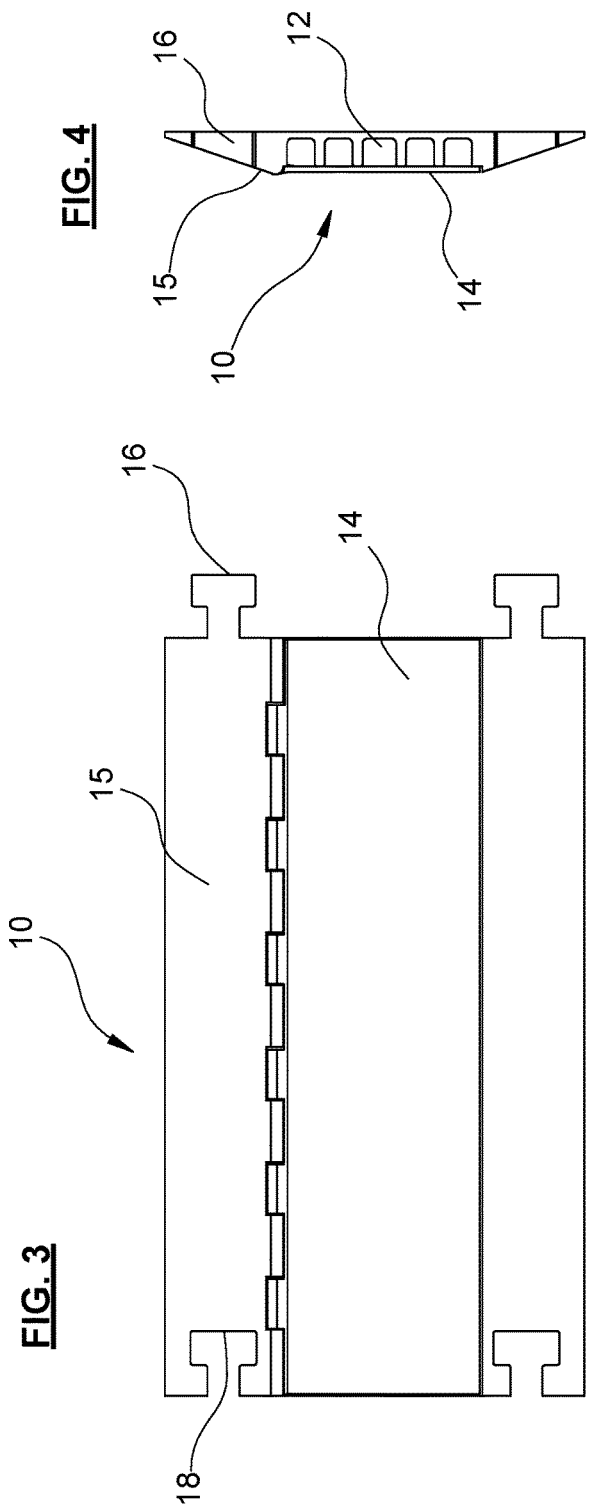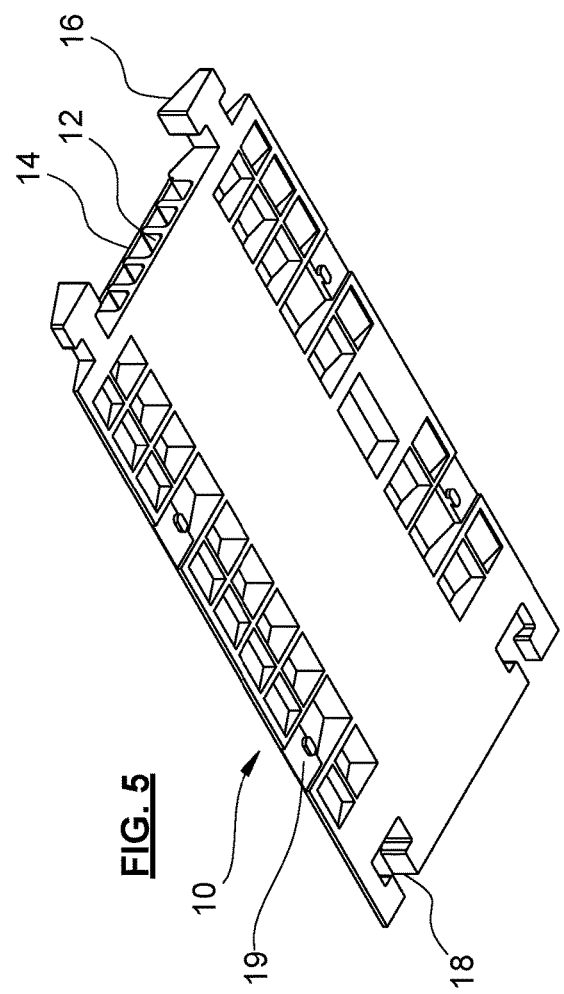

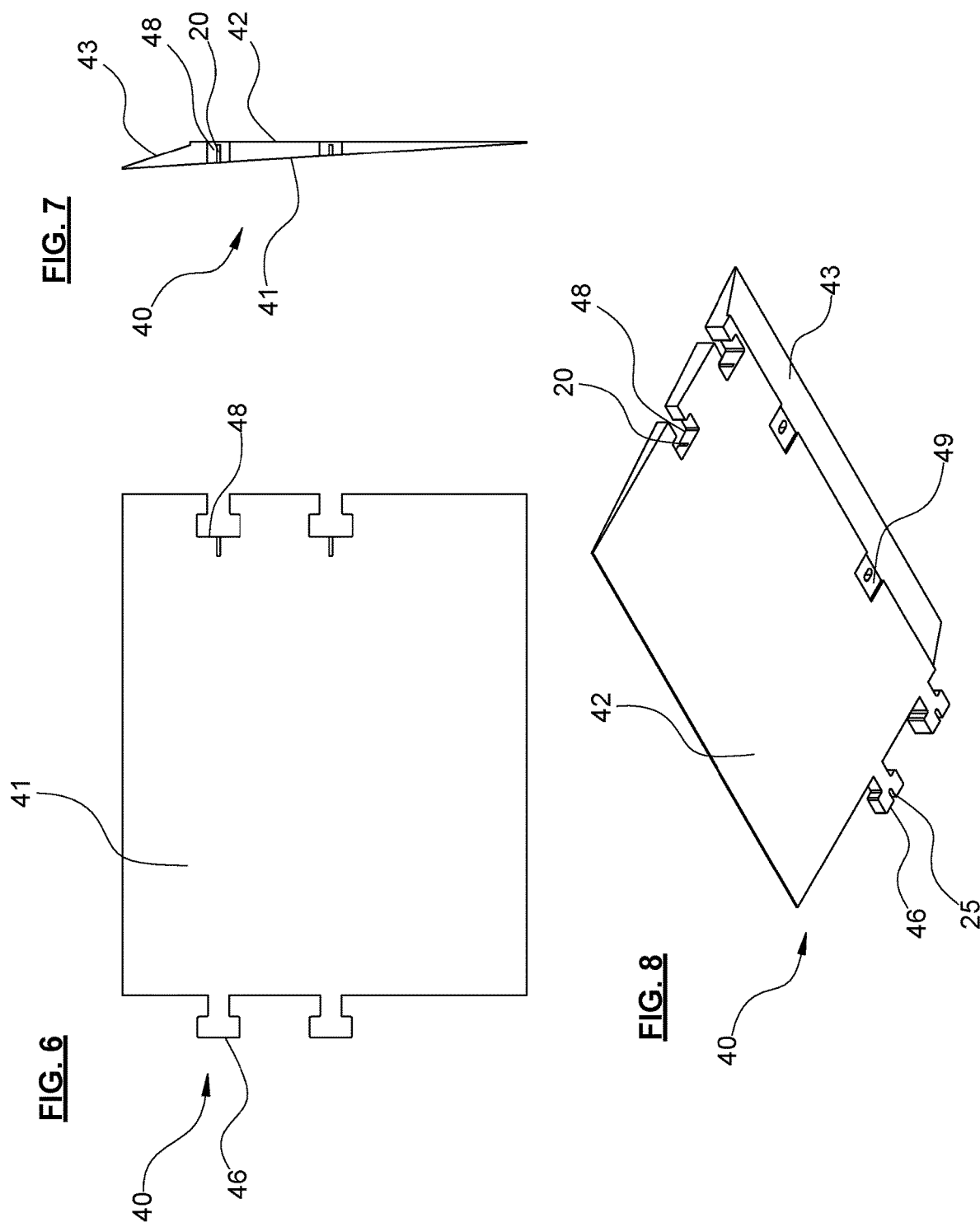

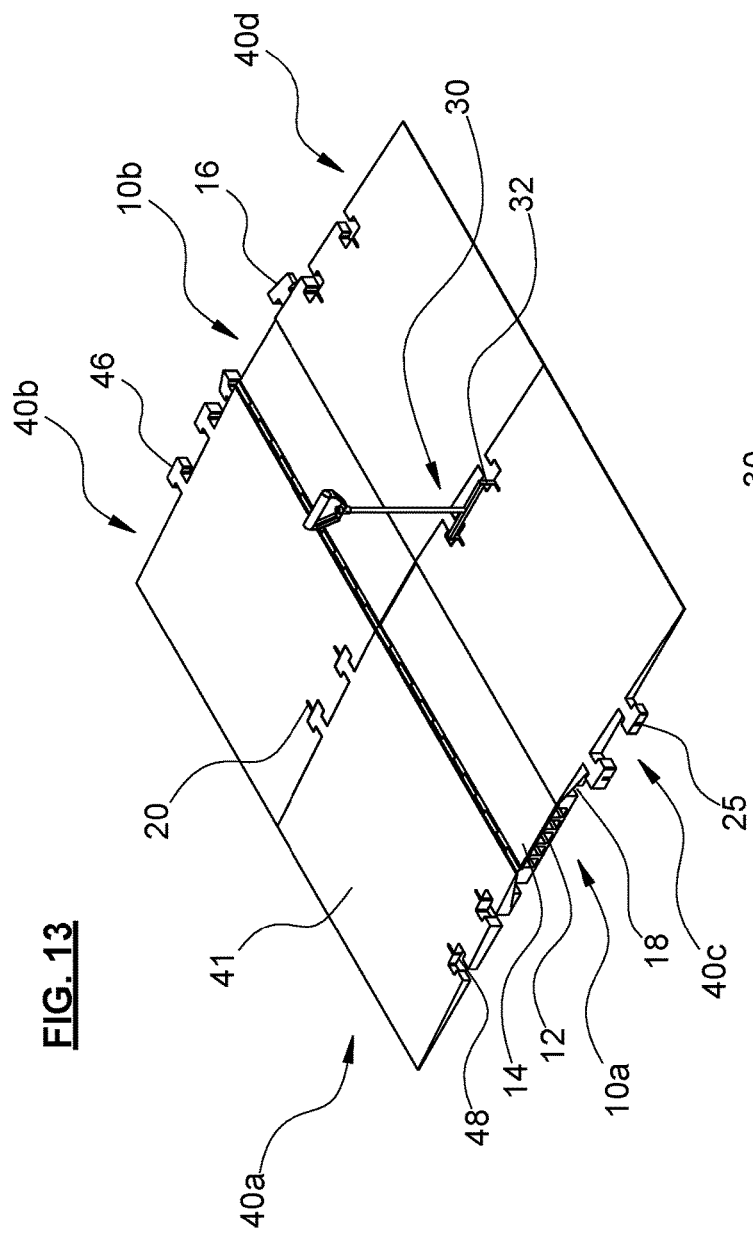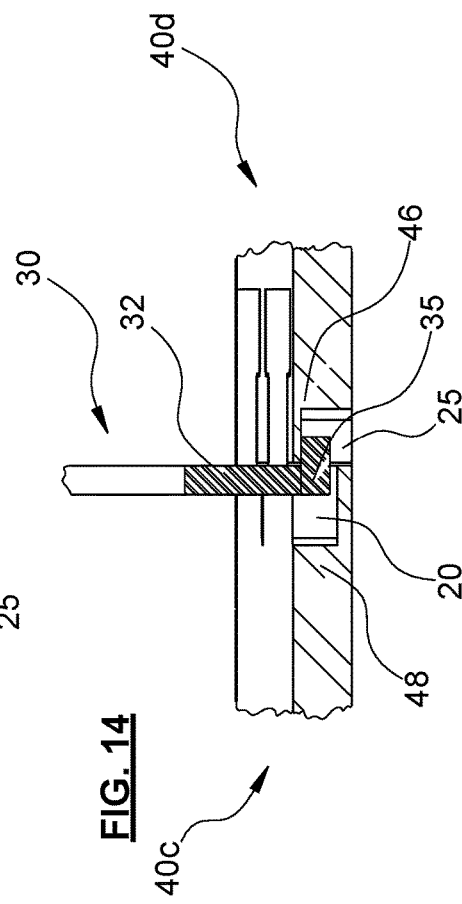

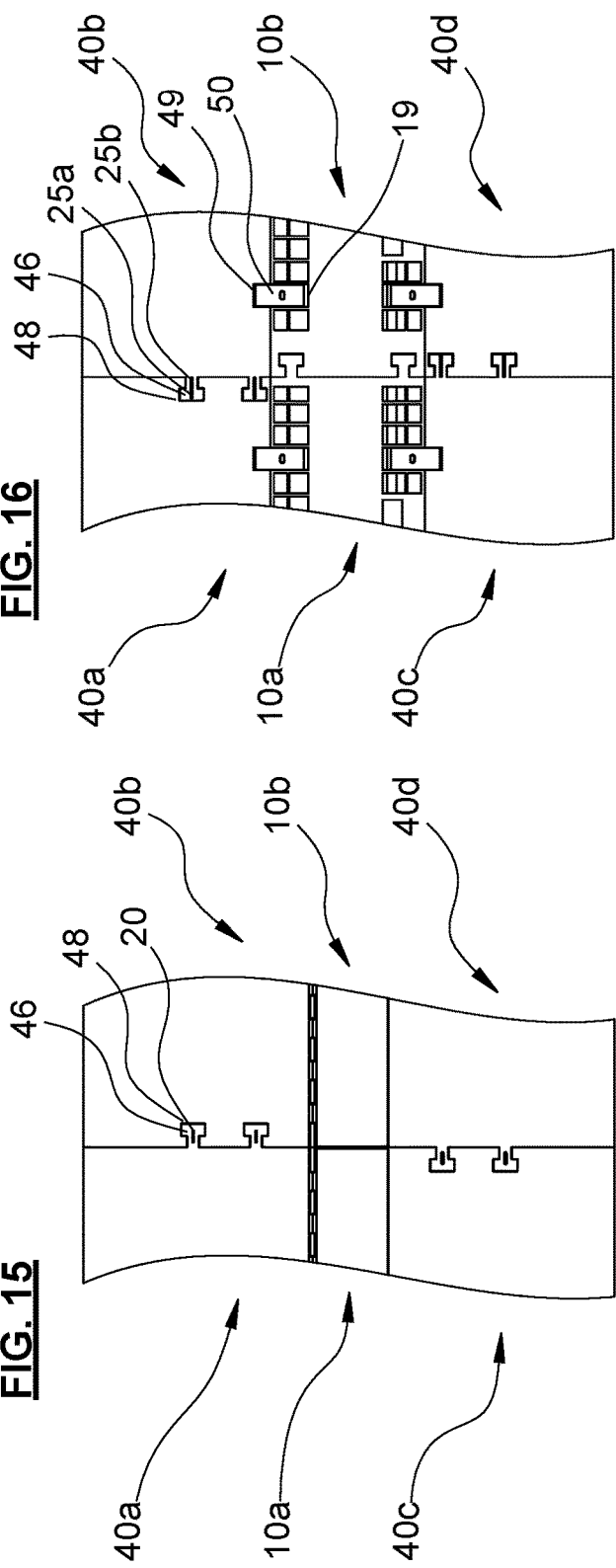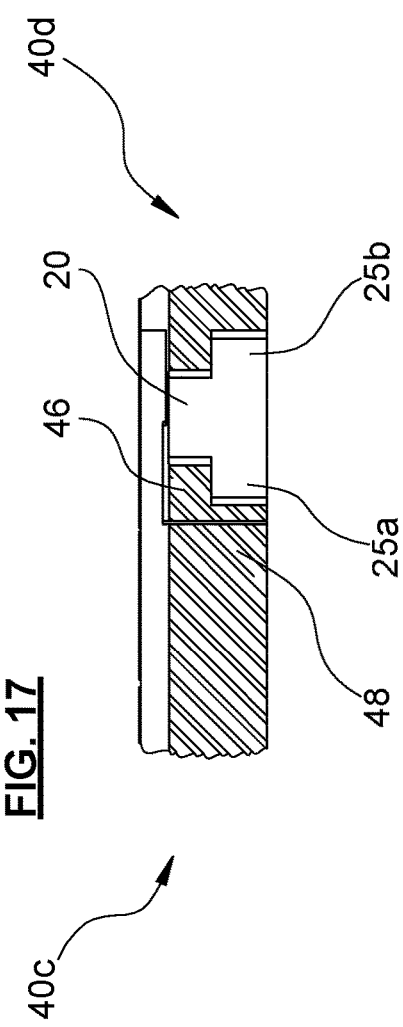

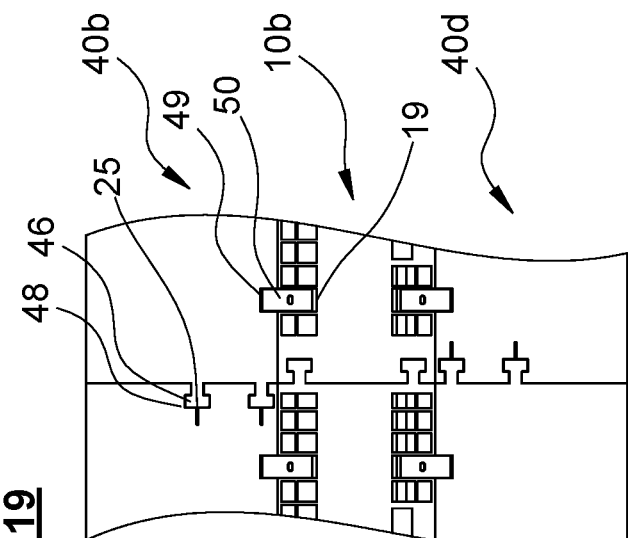
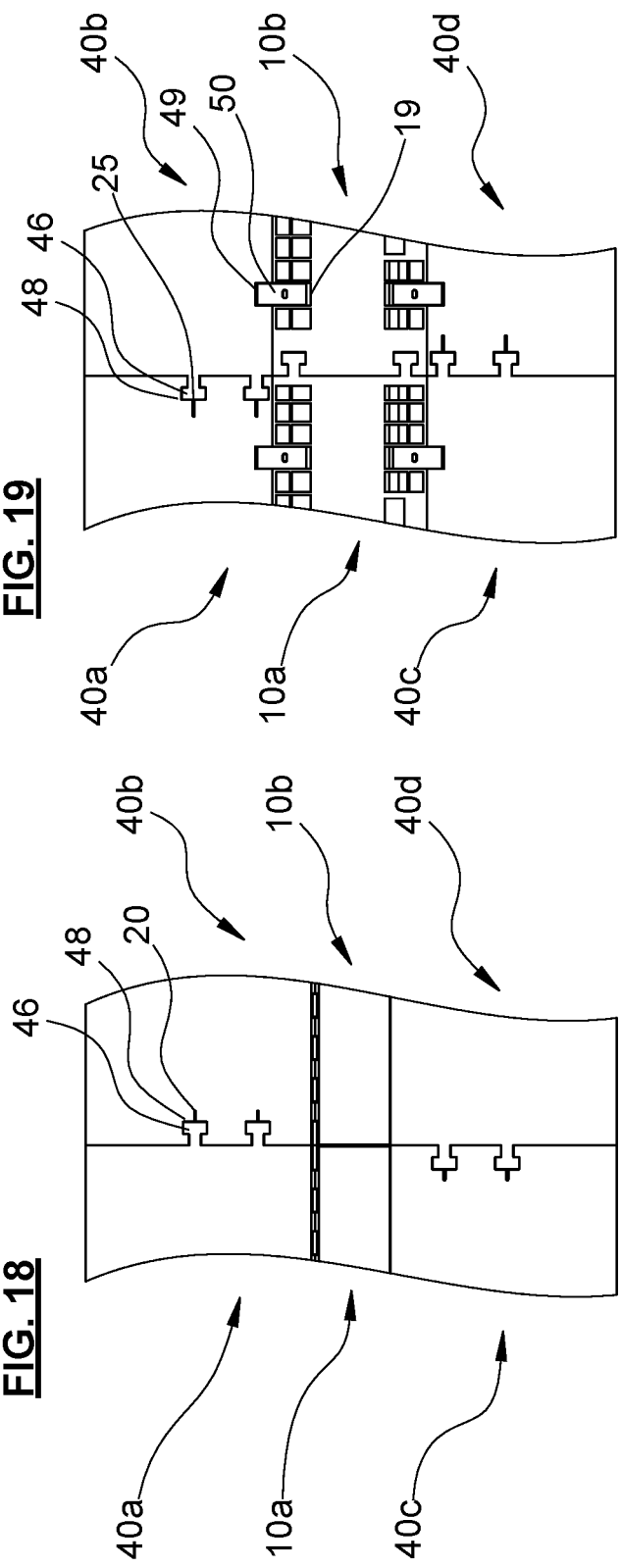
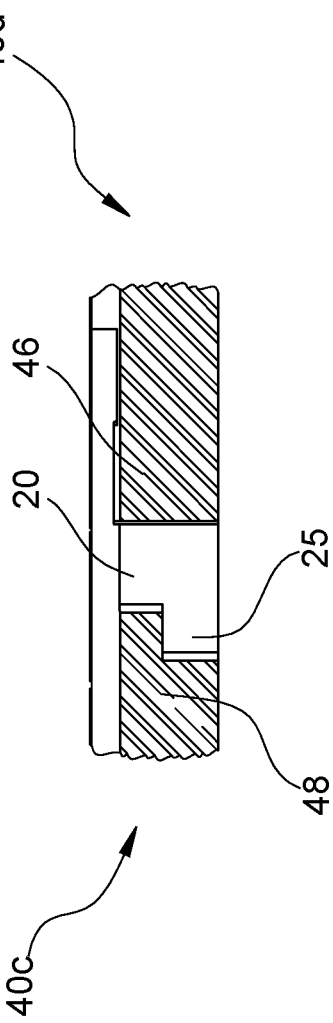

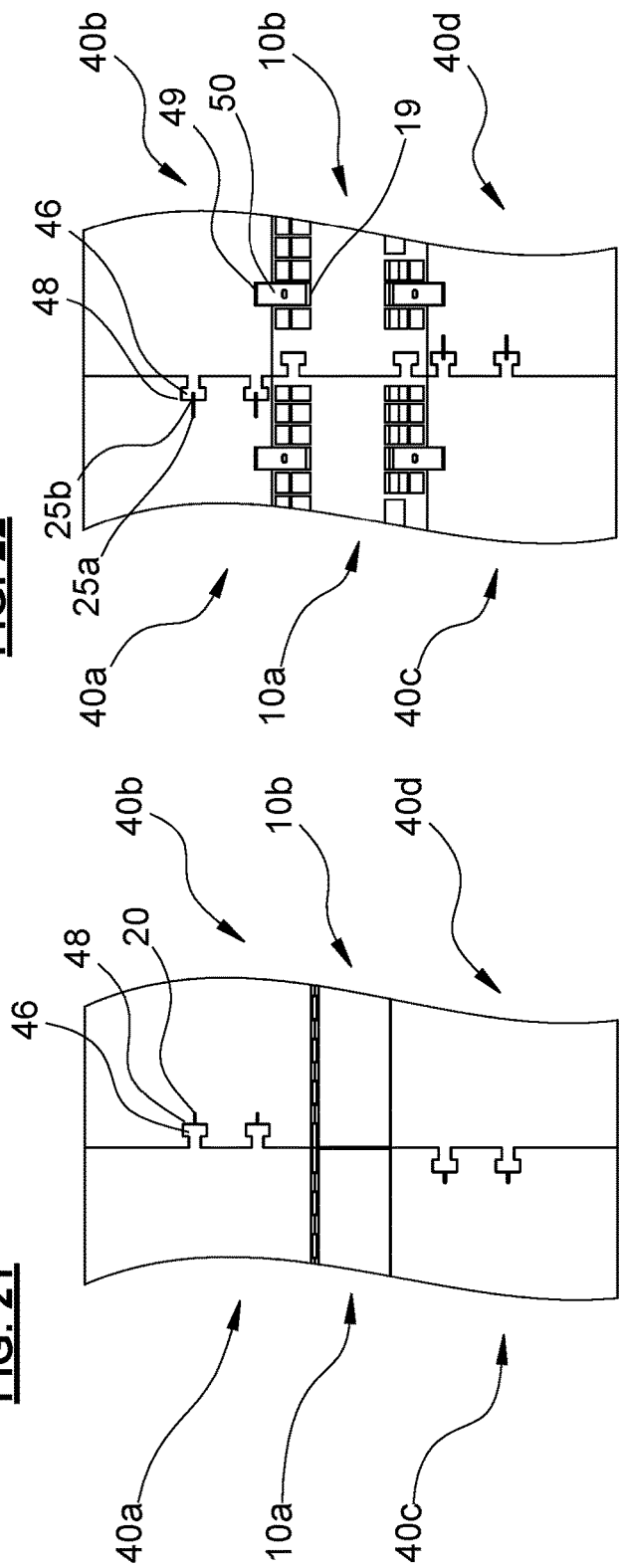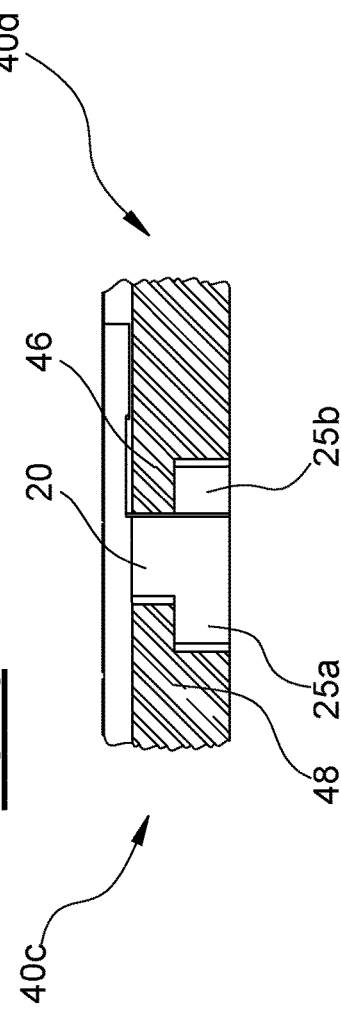

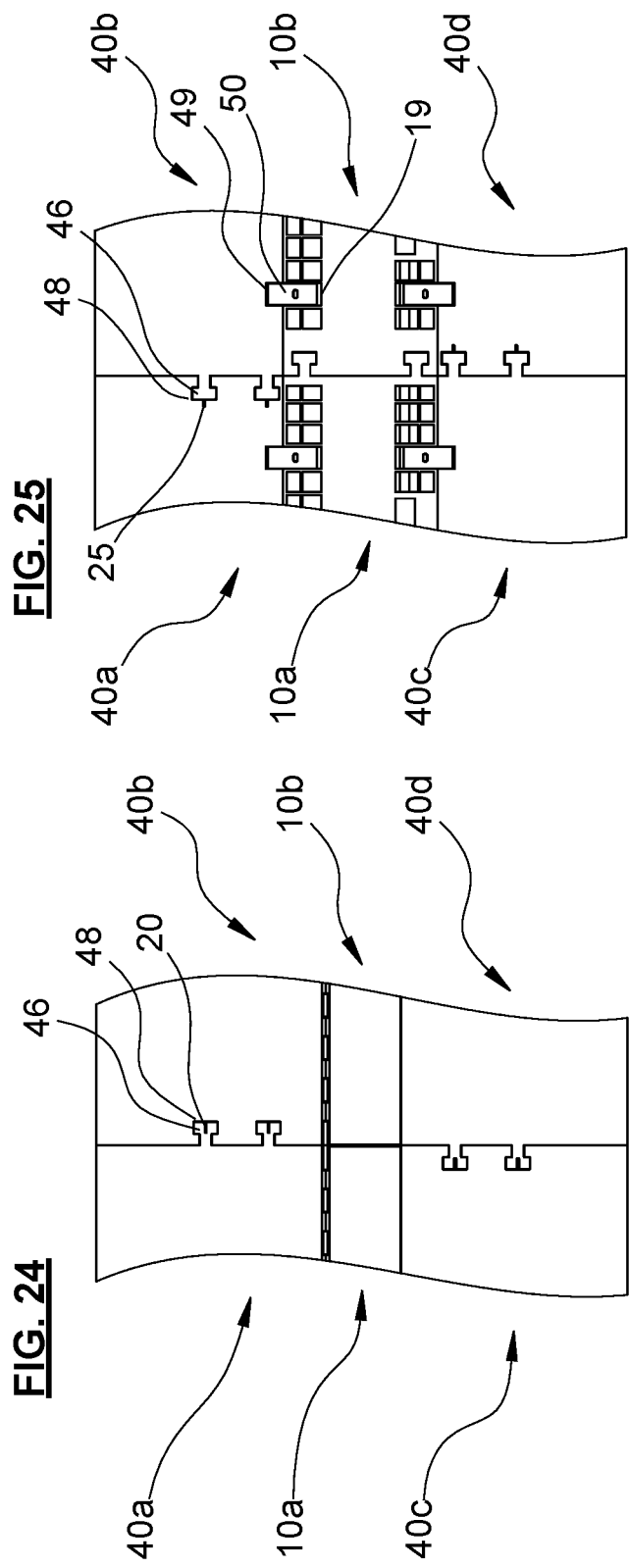
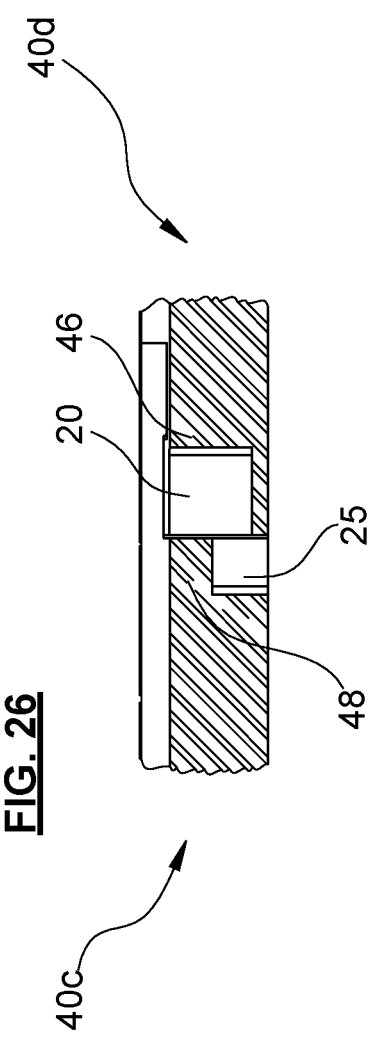

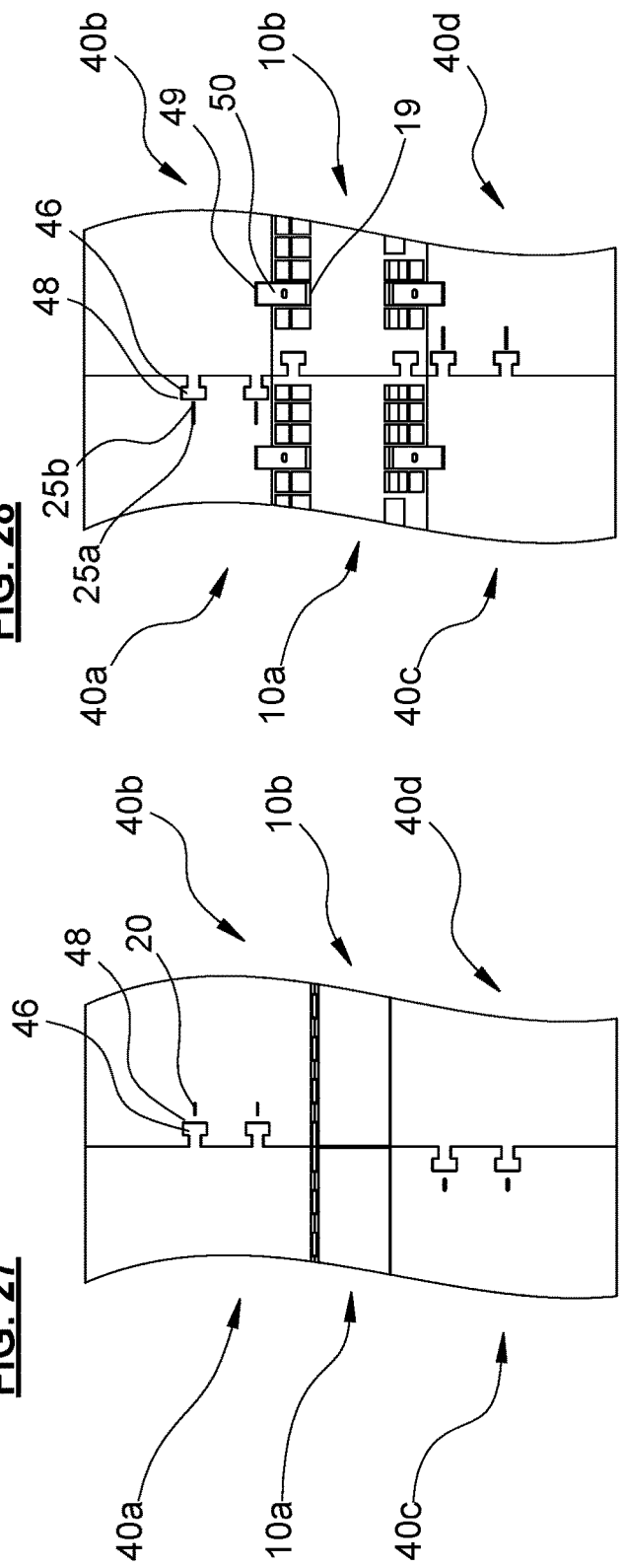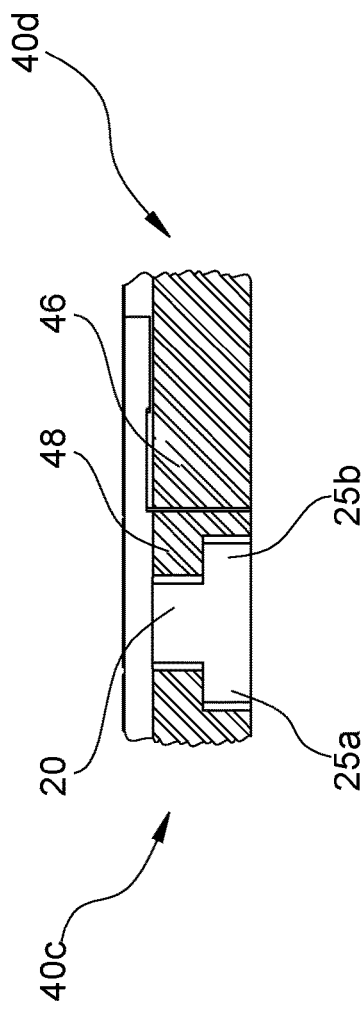

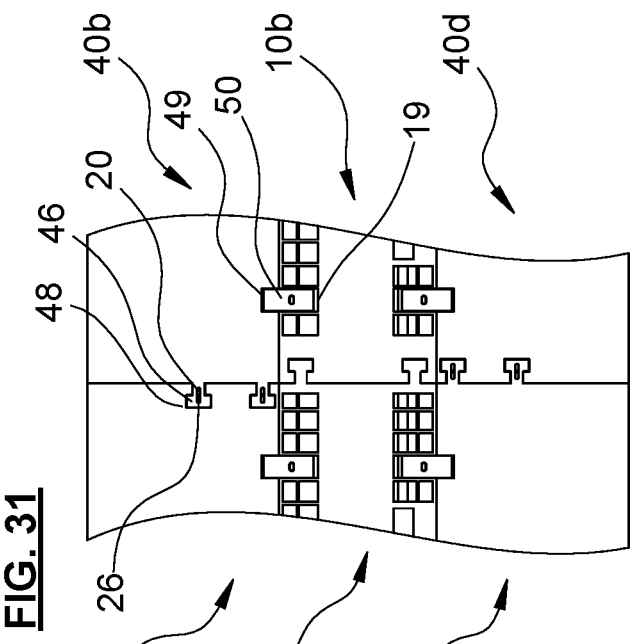
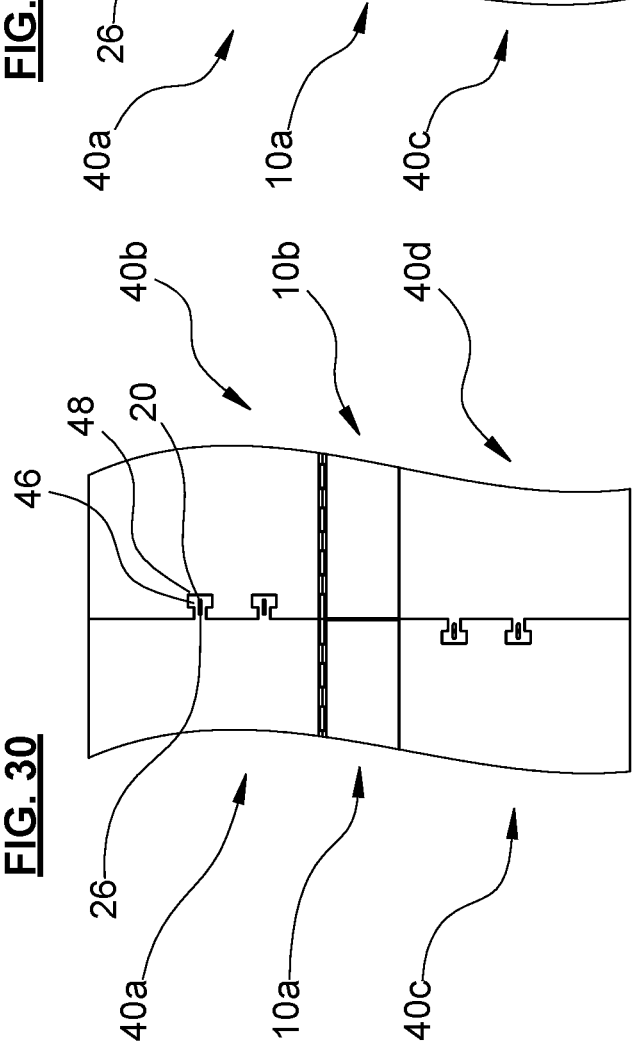
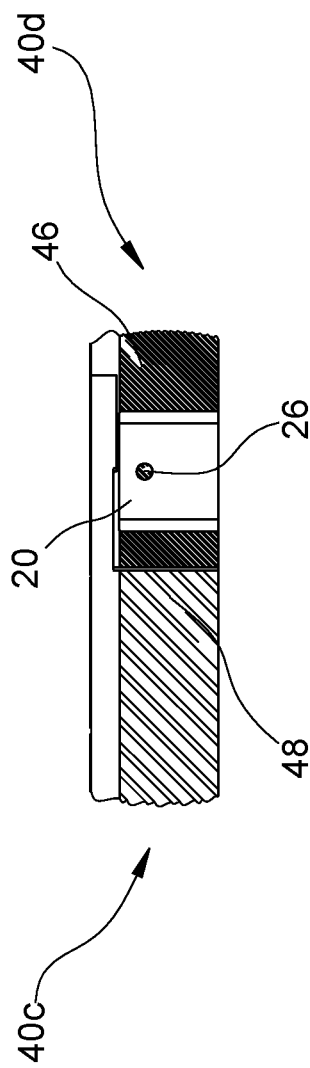

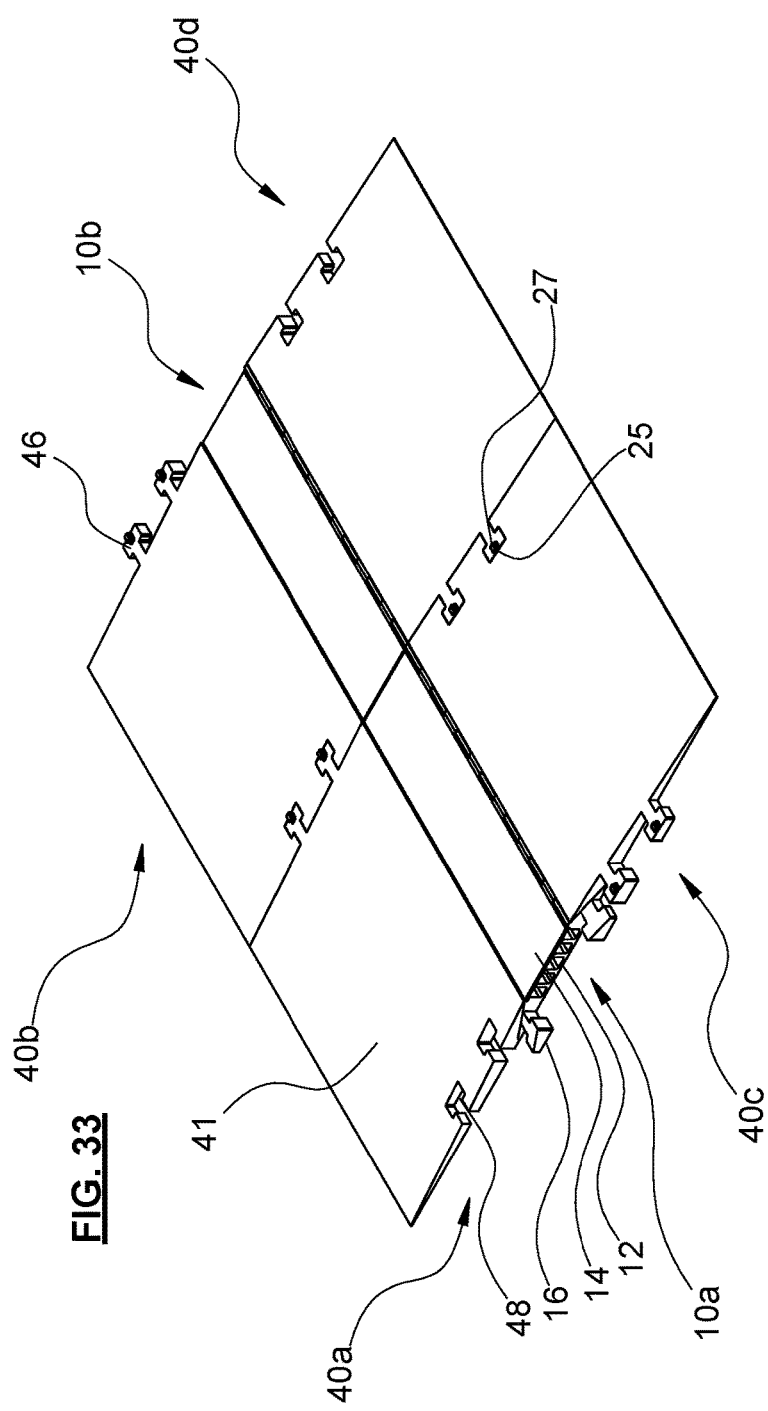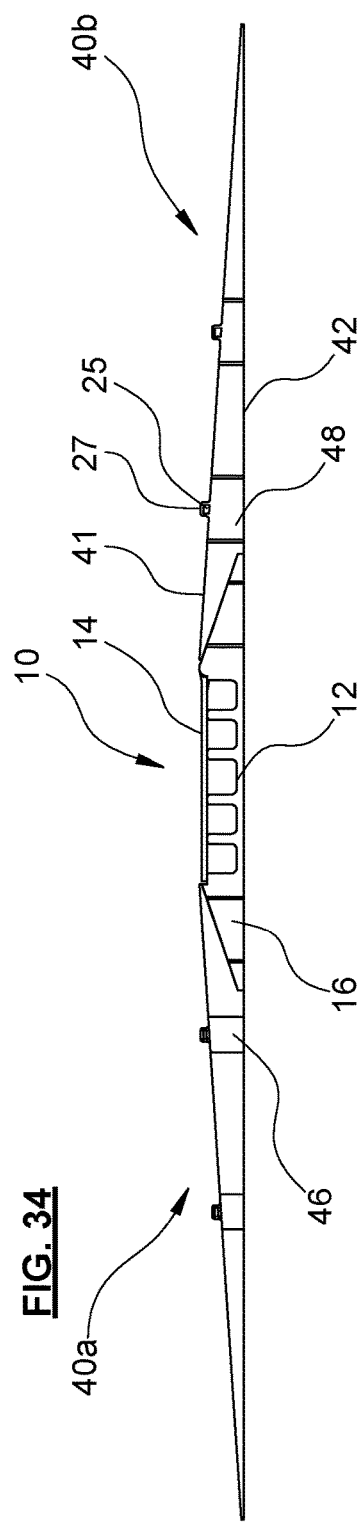

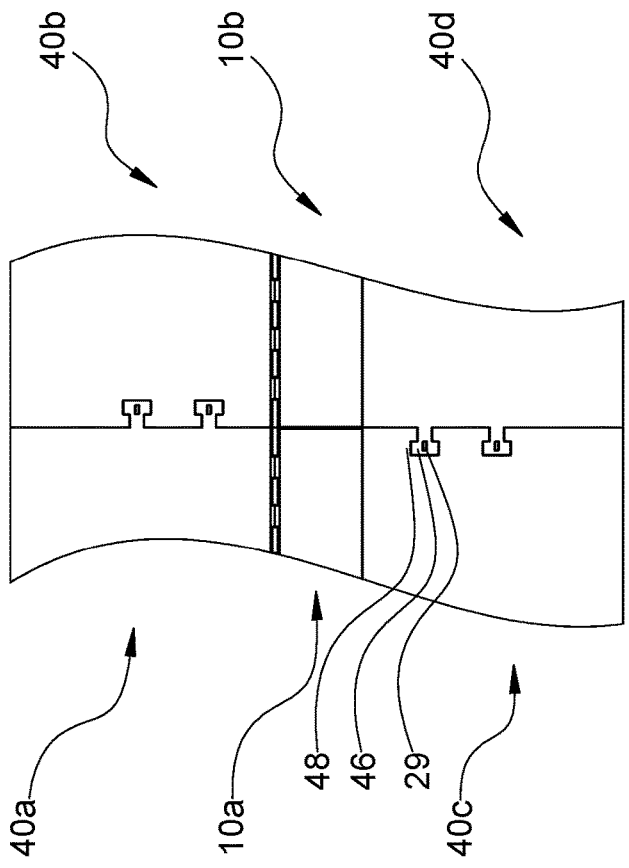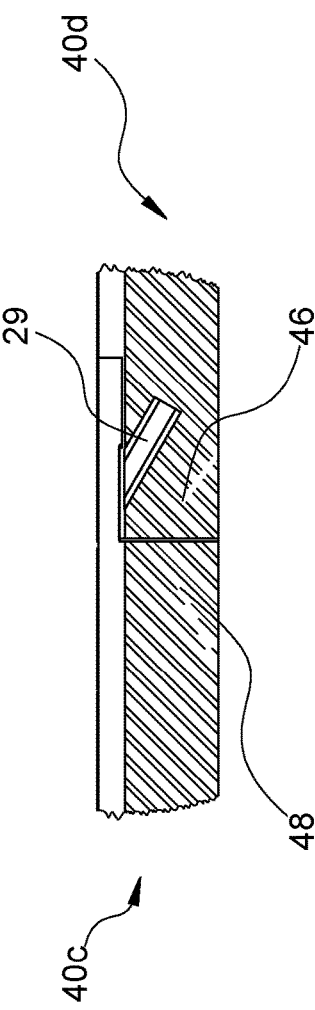

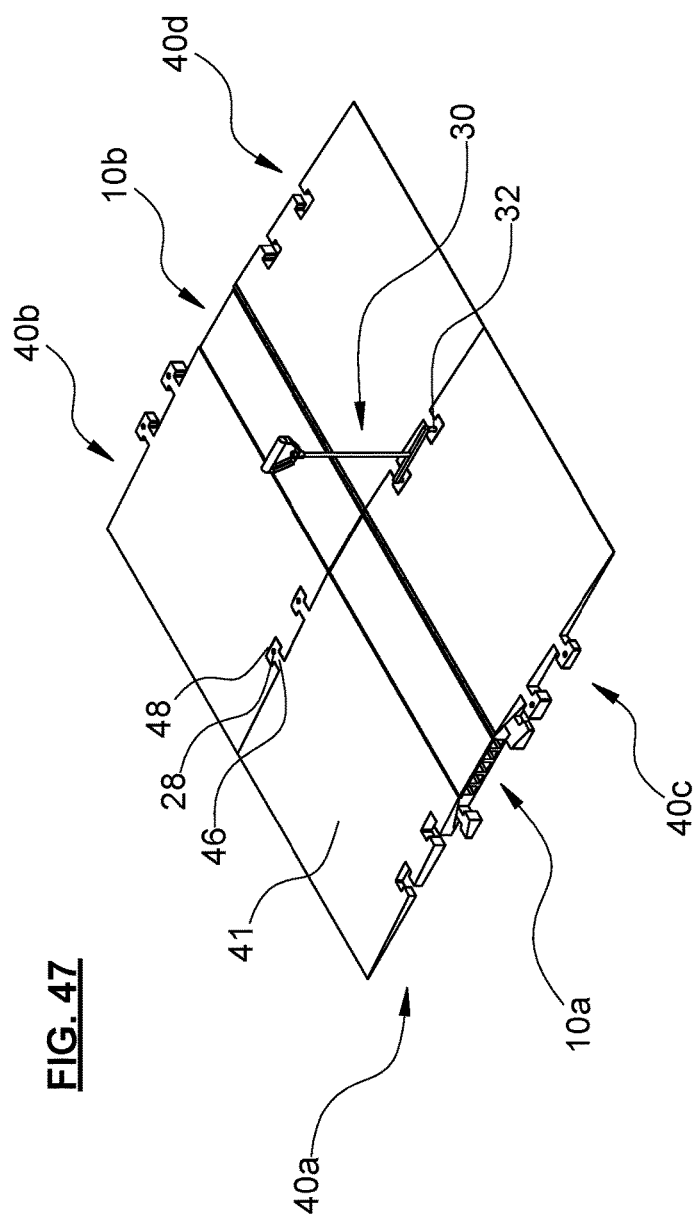
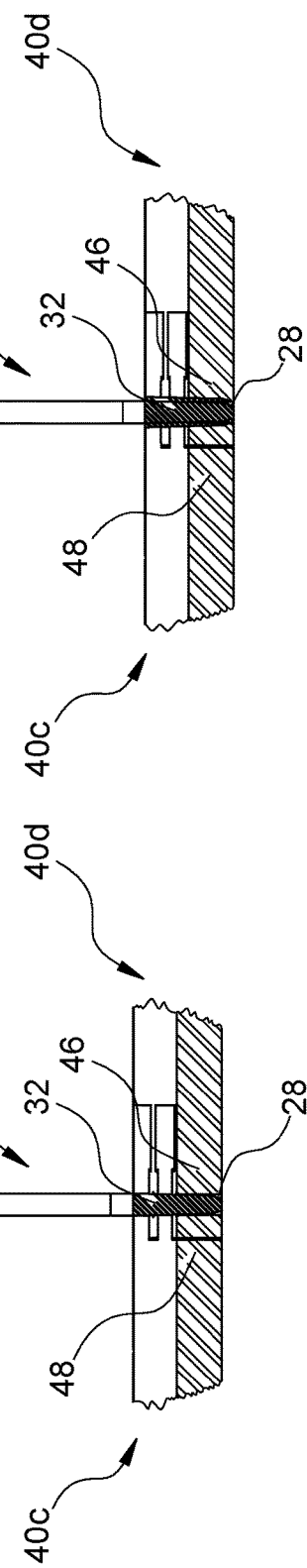

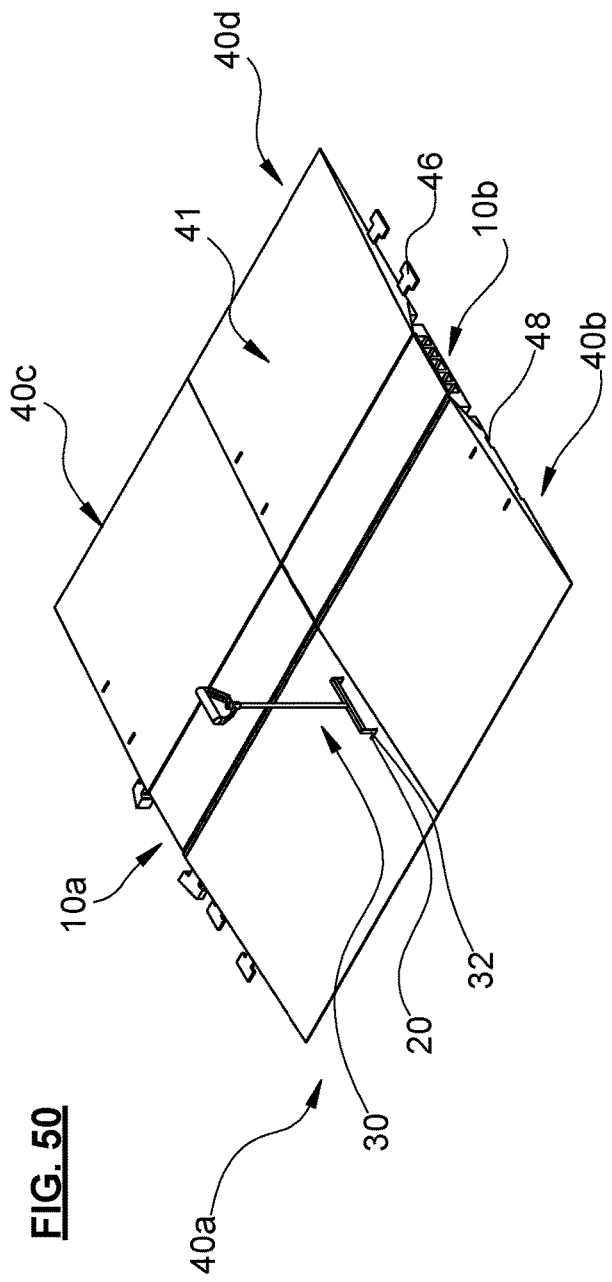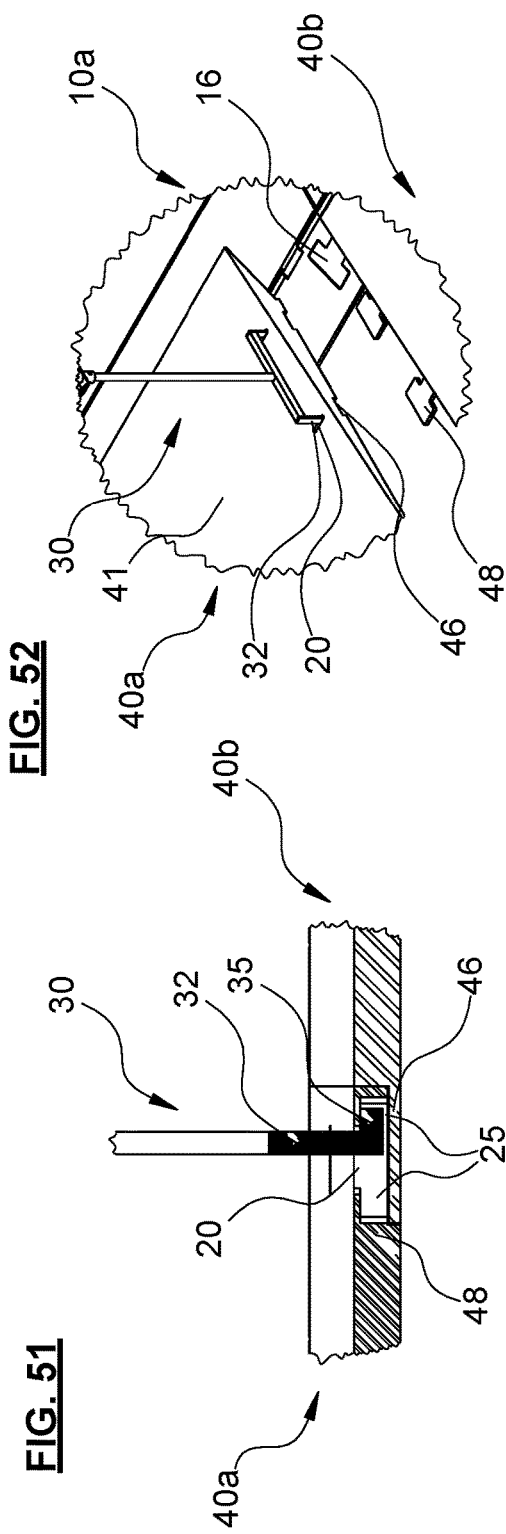

DISCONNECT SYSTEM FOR AN AUXILIARY SIDE RAMP FOR A MODULAR CABLE PROTECTOR

RELATED APPLICATION

The present application is based on and claims priority to the Applicant's U.S. Provisional Patent Application 62/732,147, entitled "Disconnect System for an Auxiliary Side Ramp for a Modular Cable Protector," filed on Sep. 17, 2018.

BACKGROUND OF THE INVENTION

Field of the Invention

The present invention relates generally to the field of modular cable protectors. More specifically, the present invention discloses an auxiliary side ramp for providing wheel chair access across modular cable protectors that includes tool engagement features to facilitate disassembly.

Statement of the Problem

Modular cable protectors have been used for many years to protect cables, hoses and wiring from vehicular traffic and to minimize trip hazards for pedestrians. Cable protectors are frequently used at public events, such as concerts and sports events. Cable protectors are also used in factories, warehouses, mines and other situations where temporary cables, hoses and the like are deployed.

U.S. Design Pat. No. 412,490 (Henry) shows an example of a modular cable protector that has been widely used in the industry. As shown in the accompanying figures, a modular cable protector 10 typically includes a number of parallel, recessed channels 12 extending between the ends of the cable protector for carrying cables, hoses, wiring or the like. Two opposing side ramps 15 guide traffic over the cable protector. Complementary sets of end connectors 16 and 18 at the ends of the cable protector enable multiple cable protectors to be connected in series. For example, the cable protector shown in the Henry design patent features complementary male and female end connectors that are generally T-shaped. Several other end connector shapes are also commonly used.

A lid 14 covers the channels and forms the top surface of the cable protector when the lid is closed. The lid pivots about a hinge running along one side so that the lid can be raised to provide access to the channels 12. These cable protectors can be strung together in series to any desired length by engaging the complementary male and female connectors at the ends of the cables protectors. Large numbers of these cable protectors are often used at large sports or music venues.

As previously mentioned, most cable protectors are equipped with opposing side ramps 15. The angle of inclination of these side ramps is sufficiently low to facilitate normal foot traffic and to reduce the risk of the cable protector being a trip hazard to pedestrians. However, the angle of inclination of a normal side ramp 15 may be greater than optimal for people in wheelchairs or other types of wheeled vehicles wishing to cross the cable protector. To address this problem, some cable protector systems can be equipped with optional auxiliary side ramps 40a-40d that removably attach over the side ramps 15 of the cable protector 10, to thereby effectively lengthen and decrease the angle of inclination of the side ramps 15.

The auxiliary side ramps 40a-40d are sometimes deployed singly or in opposing pairs attached to one cable protector 10 to provide a fairly narrow path for wheeled traffic. Sometimes multiple auxiliary side ramps are deployed on each side of the cable protector to provide a broader cross-over path. The auxiliary side ramps can be equipped with edge connectors 46, 48 to removably secure adjacent side ramps 40a-40b and 40c-40d together and ensure a tight side-by-side connection, as shown in FIGS. 1 and 2. The edge connectors 46, 48 can have complementary male and female T-shaped configurations, similar to the end connectors on the modular cable protectors. However, other shapes and configurations could be readily substituted.

The problem is that disassembling these cable protectors and auxiliary side ramps can be very labor intensive, particularly if a large number of these components are used at a venue. A worker must stoop down at each auxiliary side ramp and place his fingers under its edges to exert an upward force to separate it from the cable protector and disengage its edge connectors from the adjacent auxiliary side ramp.

It should also be noted that auxiliary side ramps are relatively large and awkward for one person to lift. When separating two adjacent auxiliary side ramps, their edge connectors may tend to bind against one another unless one of the auxiliary side ramps is removed with a purely vertical movement. But, the extended length of the auxiliary side ramp makes it difficult to lift the auxiliary side ramp straight upward without exerting a torque on the edge connectors. Therefore, a need exists for a means to facilitate disassembly of auxiliary side ramps using a vertical movement to minimize binding.

Solution to the Problem

The present invention simplifies disassembly of auxiliary side ramps by providing tool engagement features on the auxiliary sides ramps that can be removably engaged by a hand tool. This enables the auxiliary side ramps to be quickly and easily disassembled. It also helps to ensure that the auxiliary side ramps are lifted upward in a substantially vertical direction to minimize binding of their edge connectors.

For example, the tool engagement features can be a set of slots or recesses extending downward from the top of the auxiliary side ramp adjacent to the edge connectors. The bottom of each slot is equipped with a horizontal undercut or lip within the auxiliary side ramp. The worker can insert a tool into the slots to engage these lips and then exert an upward force to disengage the edge connectors from an adjacent auxiliary side ramp. In this embodiment, the tool can have two vertical rods that fit into the slots, with horizontal protrusions at the bottom of the rods to engage the undercuts in the slots. These slots can be placed in a variety of locations (e.g., on the male connectors, near the head of the female connectors, or near the edges of the auxiliary side ramp adjacent to the edge connectors).

SUMMARY OF THE INVENTION

This invention provides an auxiliary side ramp for use with modular cable protectors that includes a number of tool engagement features. A tool can be used to removably engage these tool engagement features and allows a user to exert an upward force to disengage the edge connectors on adjacent auxiliary side ramps, and also disengage the auxiliary side ramp from the underlying cable protector. For example, the tool engagement features can be slots in the top surface of the auxiliary side ramp with undercuts adjacent to the lower ends of the slots. A tool with vertical rods is manually inserted into the slots to disengage the cable protectors. Horizontal projections at the bottom of the vertical rods engage the undercuts in the slots, and allow the user to disengage adjacent auxiliary side ramps by lifting upward on the tool. Alternatively, the tool engagement features could be pins, hooks, eyebolts, raised loops, threaded inserts or holes, undercuts, angled holes, friction-fit holes, or the like that can be removably engaged by a tool to exert an upward force to lift the auxiliary side ramp.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 3 is a top view of a cable protector 10.

FIG. 4 is a right side view of the cable protector 10.

FIG. 5 is a bottom axonometric view of the cable protector 10.

FIG. 6 is a top view of an auxiliary side ramp 40.

FIG. 7 is a right side view of the auxiliary side ramp 40 corresponding to FIG. 6.

FIG. 8 is a bottom axonometric view of the auxiliary side ramp 40 corresponding to FIGS. 6 and 7.

FIG. 13 is a top axonometric view corresponding to FIG. 2, showing the assembled auxiliary side ramps 40a-40d with the tool 30 inserted in the slots 20.

FIG. 14 is a detail vertical cross-sectional view of the edge connectors 46, 48 after insertion of the tool 30, corresponding to FIG. 13.

FIG. 15 is a detail top view of four assembled auxiliary side ramps 40a-40d in an alternative embodiment of the present invention in which the slots 20 are located on the male edge connectors 46.

FIG. 16 is a detail bottom view corresponding to FIG. 15.

FIG. 17 is a detail vertical cross-sectional view corresponding to FIGS. 15 and 16.

FIG. 18 is a detail top view of four assembled auxiliary side ramps 40a-40d in another embodiment of the present invention in which the slots 20 and undercuts 25 are located at the head of the female edge connectors 48.

FIG. 19 is a detail bottom view corresponding to FIG. 18.

FIG. 20 is a detail vertical cross-sectional view corresponding to FIGS. 18 and 19.

FIG. 21 is a detail top view of four assembled auxiliary side ramps 40a-40d in another embodiment of the present invention in which the slots 20 are located at the head of the female edge connectors 48.

FIG. 22 is a detail bottom view corresponding to FIG. 21. Each slot 20 is equipped with two undercuts 25a, 25b, with one extending into the male edge connector 46 of the adjacent auxiliary side ramp 40d and the other undercut extending in the opposite direction into the auxiliary side ramp 40c.

FIG. 23 is a detail vertical cross-sectional view corresponding to FIGS. 21 and 22.

FIG. 24 is a detail top view of four assembled auxiliary side ramps 40a-40d in another embodiments of the present invention in which the slots 20 are located at the ends of the male edge connectors 46, and the undercut 25 extends into the adjacent auxiliary side ramp 40b, 40c at the head of the female edge connectors 48.

FIG. 25 is a detail bottom view corresponding to FIG. 24.

FIG. 26 is a detail vertical cross-sectional view corresponding to FIGS. 24 and 25.

FIG. 27 is a detail top view of four assembled auxiliary side ramps 40a-40d in another embodiment of the present invention in which the slots 20 are located near the female edge connectors 48. Each slot 20 is equipped with two undercuts 25a, 25b extending in opposite directions.

FIG. 28 is a detail bottom view corresponding to FIG. 27.

FIG. 29 is a detail vertical cross-sectional view corresponding to FIGS. 27 and 28.

FIG. 30 is a detail top view of four assembled auxiliary side ramps 40a-40d in another embodiment of the present invention in which the slots 20 are located on the male edge connectors 46. A pin 26 extends across each slot 20 to serve as an undercut.

FIG. 31 is a detail bottom view corresponding to FIG. 30.

FIG. 32 is a detail vertical cross-sectional view corresponding to FIGS. 30 and 31.

FIG. 33 is an axonometric view of four assembled auxiliary side ramps 40a-40d in another embodiment of the present invention in which raised tool engagement features 27 are located on the top surfaces of the male edge connectors 46.

FIG. 34 is an end view corresponding to FIG. 33.

FIG. 37 is a detail top view of four assembled auxiliary side ramps 40a-40d with angled holes 29 in the male edge connectors 46.

FIG. 38 is a vertical cross-section view corresponding to FIG. 37.

FIG. 47 is a top axonometric view of auxiliary side ramps 40a-40d being disassembled by a tool 30 inserted into holes 28 in the male edge connectors 46.

FIG. 48 is a detail vertical cross-sectional view corresponding to FIG. 47 showing one of the lower ends of the tool 30 in a friction fit with the hole 28 in a male edge connector 46.

FIG. 49 is a detail vertical cross-sectional view corresponding to FIG. 48 showing an alternative embodiment in which the lower ends of the tool 30 expand radially outward to engage the hole 28 in the male edge connector 46.

FIG. 50 is a top axonometric view of auxiliary side ramps 40a-40d with hidden edge connectors 46, 48 being disassembled by a tool 30.

FIG. 51 is a detail vertical cross-sectional view corresponding to FIG. 50 showing the hidden edge connectors 46, 48 and tool 30.

FIG. 52 is a detail axonometric view corresponding to FIGS. 50-51 showing the auxiliary side ramps 40a, 40b after the hidden edge connectors 46, 48 have been disengaged.

DETAILED DESCRIPTION OF THE INVENTION

Figure 1:
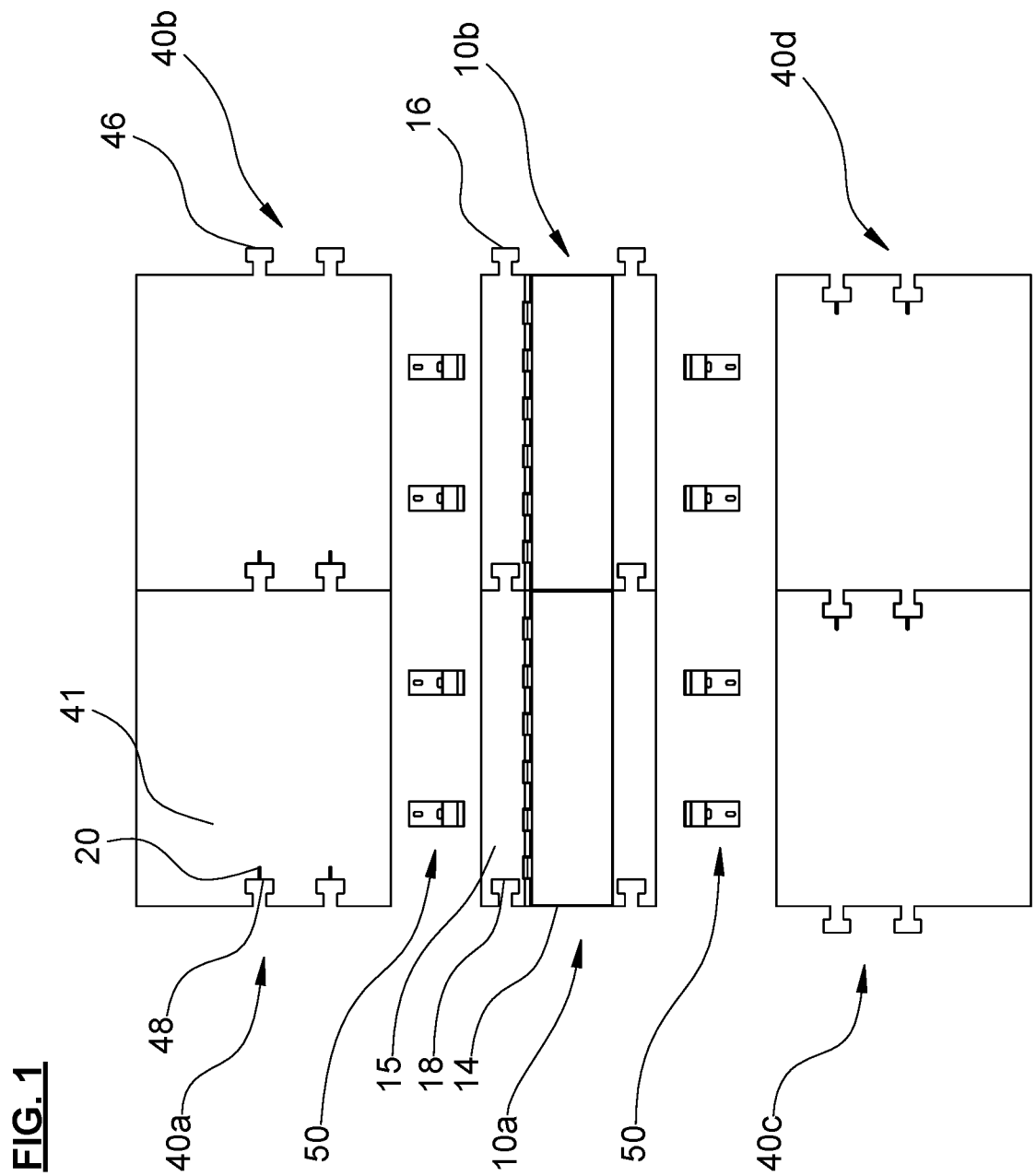
FIG. 1 is a top view of two cable protectors 10a, 10b and four auxiliary side ramps 40a-40d after partial assembly
Figure 2:
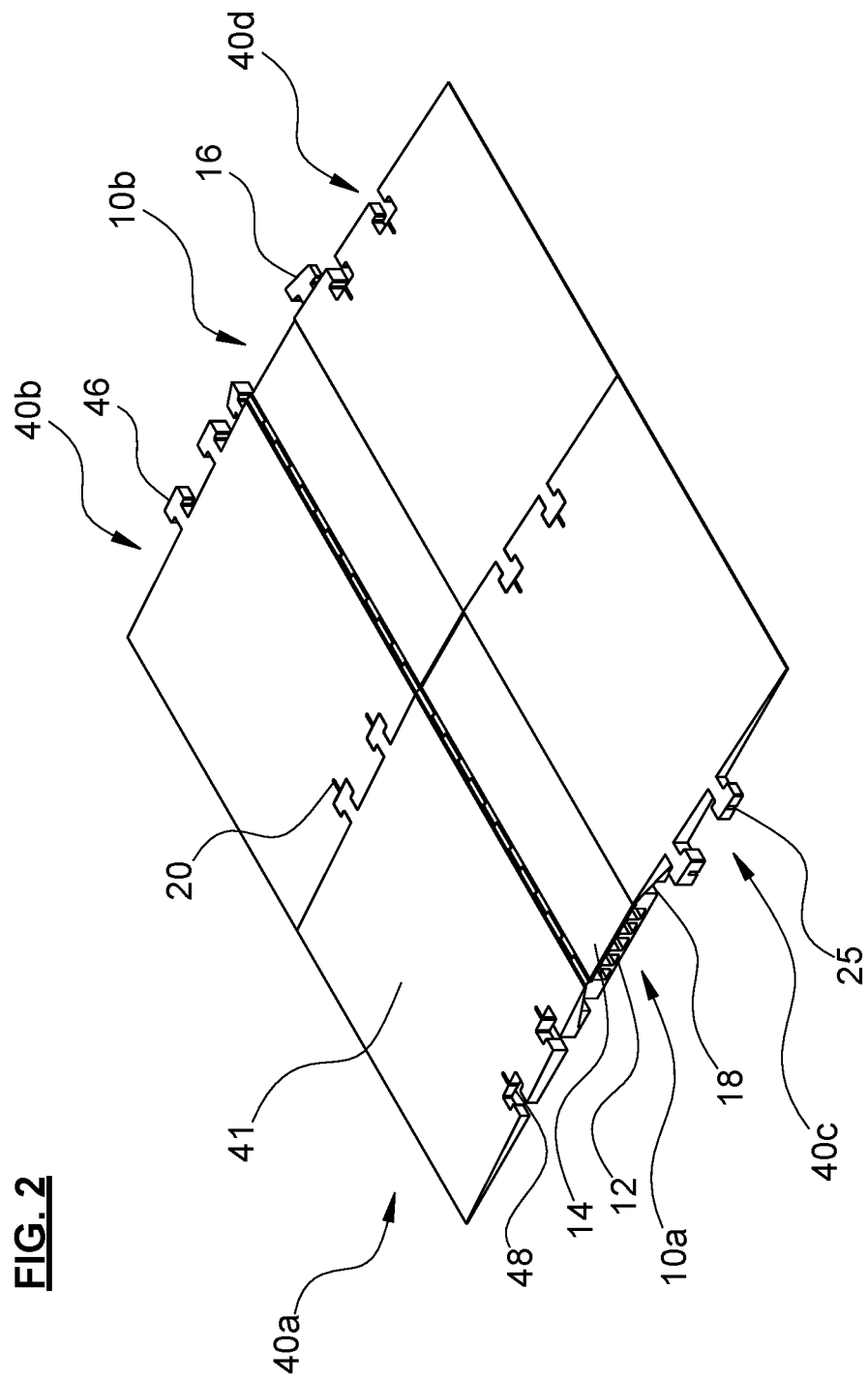
FIG. 2 is a top axonometric view corresponding to FIG. 1 after assembly has been completed.
Figure 9:
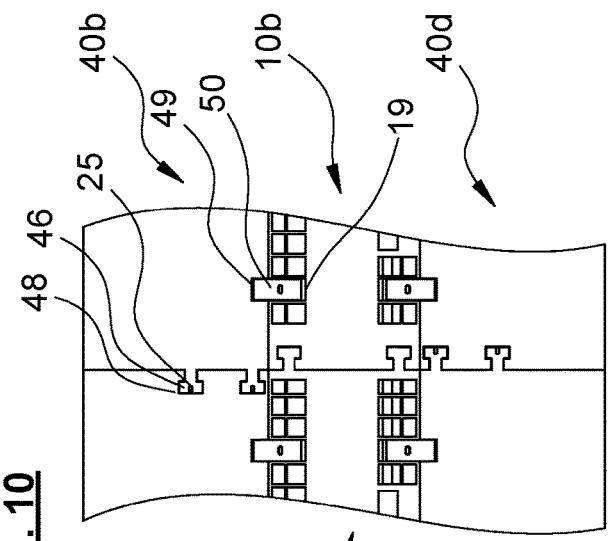
FIG. 9 is a detail top view showing the edge connectors 46, 48 between the auxiliary side ramps 40a and 40b, corresponding to FIG. 2.

FIGS. 3-5 show an example of a typical modular cable protector 10. The body of the cable protector 10 includes a number of parallel, recessed channels 12 extending between its ends for carrying cables, hoses, wiring or the like. Two opposing side ramps 15 guide traffic over the cable protector. Complementary sets of end connectors 16, 18 at the ends of the cable protector 10 enable multiple cable protectors 10a, 10b to be connected in series as shown in FIGS. 1 and 2 with the channels 12 of the cable protectors in alignment. This specific embodiment has T-shaped male end connectors 16 at one end and complementary female end connectors 18 at the other end of the cable protector 10. However, other shapes and configurations could be readily substituted for the end connectors 16, 18. A lid 14 covers the channels 12 and forms the top surface of the cable protector 10 when the lid 14 is closed to cover the interior channels 12 as illustrated in FIG. 2. The lid 14 can be pivoted about its hinge to an open position to allow access to the channels 12. The bottom of the cable protector 10 may also include a number of voids or recesses 19.

Figure 10:
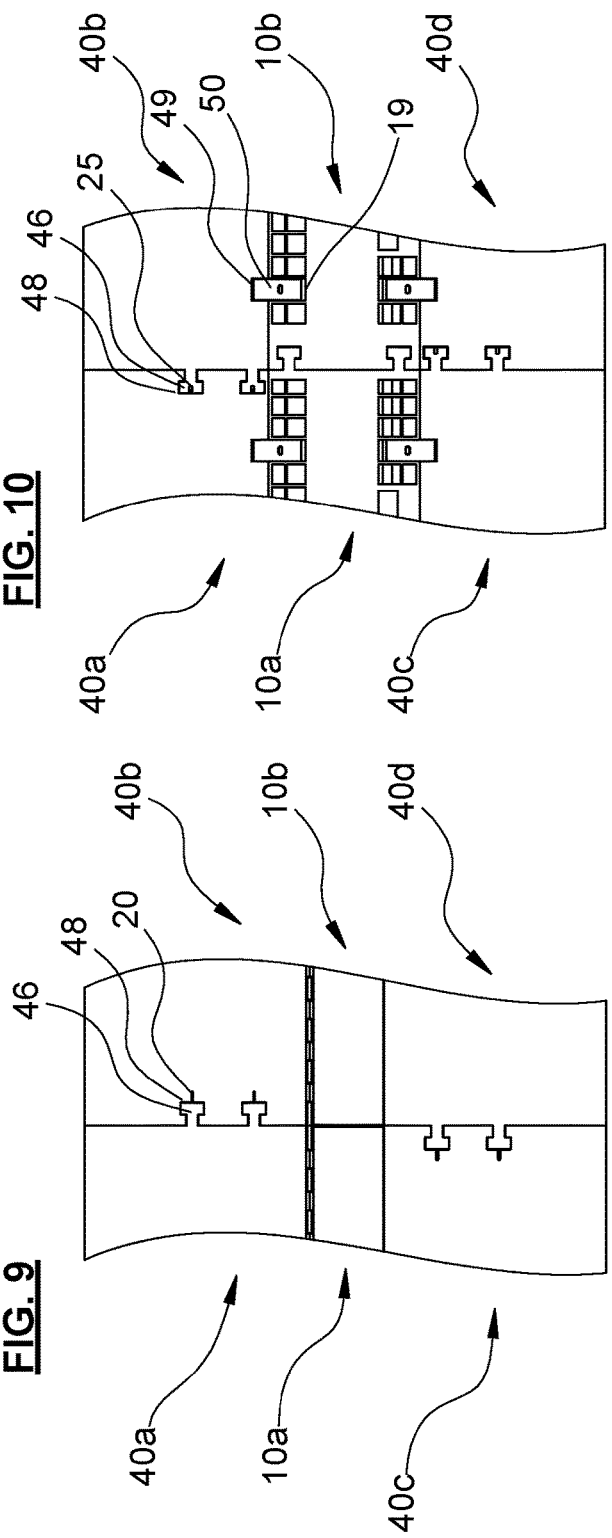
FIG. 10 is a detail bottom view corresponding to FIG. 9.

FIGS. 6-8 show an embodiment of an auxiliary side ramp 40 that can be removably placed over the side ramp 15 of a cable protector 10. This is sometimes referred to as a side extension ramp. The auxiliary side ramp 40 has a sloped top surface 41 that effectively extends and decreases the slope of the side ramp 15 to facilitate wheelchair access over the cable protector 10. The top surface 41 is substantially planar and extends upward from the ground along its distal edge to the elevation of the lid 14 along its proximal edge. The base 42 of the auxiliary side ramp 40 can be substantially flat to lay in contact with the ground. The bottom 42 can include a number of voids 49 to serve as handgrips, and to save material weight and cost, as illustrated in FIG. 8. These voids 49 can also be used to removably receive bottom connectors 50 that span between the voids 49 in the bottom of the auxiliary side ramp and corresponding voids 19 in the bottom of the cable protector 10, as shown in FIGS. 1, 10 and 16. The bottom connector 50 help to removably secure the auxiliary side ramp 40 in proper position to the cable protector 10. The vertical cross-section of the auxiliary side ramp 40 forms an obtuse triangle. The third side of this triangle is a diagonal surface or edge 43 that extends from the proximal edge of the base 42 to the proximal edge of the top surface 41 at an angle to inclination matching that of the side ramp 15 of the cable protector 10. This diagonal surface 43 rests against the side ramp 15 for structural support.

Figure 11:
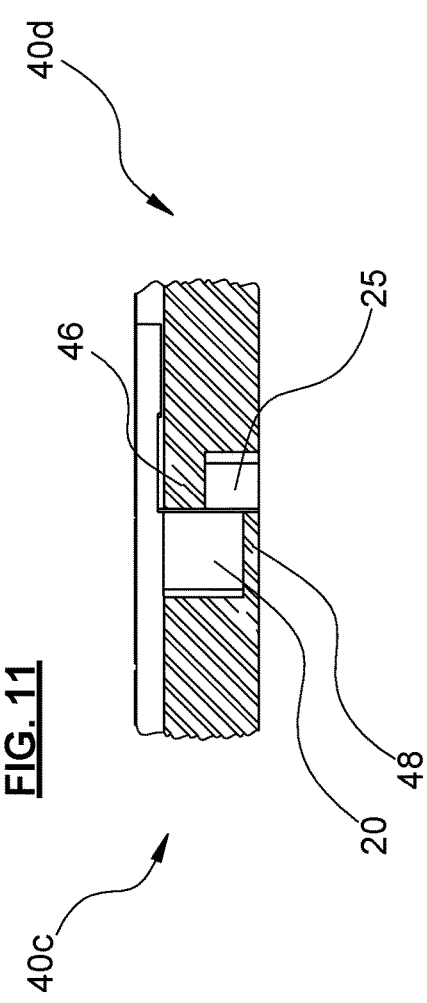
FIG. 11 is a detail vertical cross-sectional view of the edge connectors 46, 48 of the auxiliary side ramps 40a and 40b, corresponding to FIGS. 9 and 10.

The auxiliary side ramp 40 includes a number of tool engagement features for removably engaging a tool, as will be discussed in greater detail below. In the embodiment shown in FIGS. 1, 2 and 6-11, the tool engagement features are slots 20 or recesses that extend downward from the top surface of the auxiliary side ramp 40 adjacent to the edge connectors 46, 48. Each slot 20 has at least one undercut 25 extending horizontally from the lower end of the slot 20. FIG. 11 is a cross-sectional view of a slot 20 and undercut 25.

Figure 12:
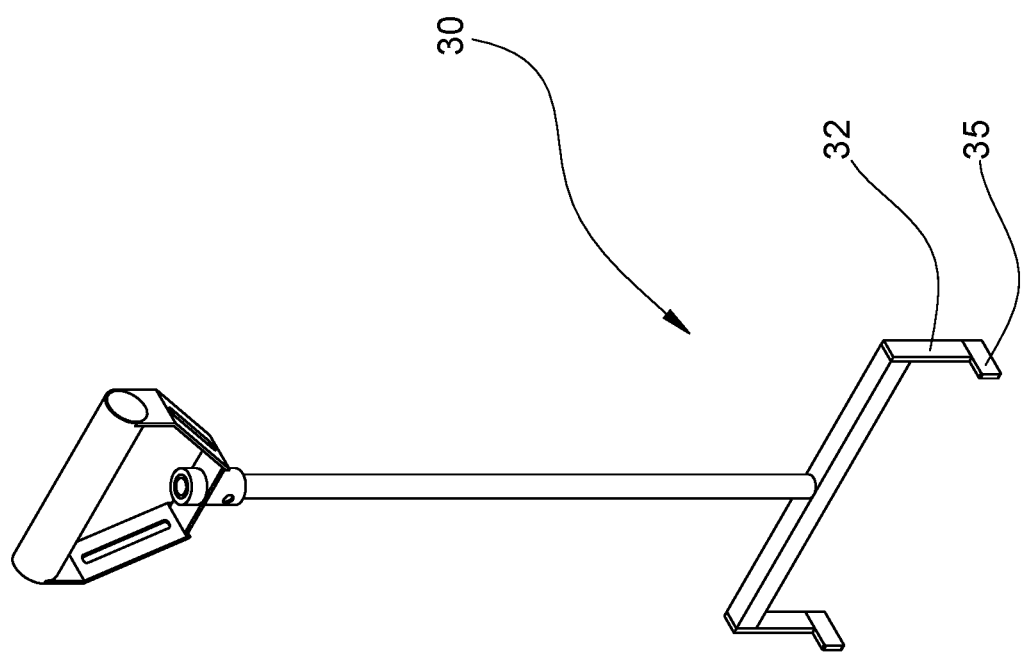
FIG. 12 is an axonometric view of the tool 30 used to disengage the auxiliary side ramps 40a-40d.

FIG. 12 illustrates one possible embodiment of a tool 30 that can be used to engage the slots 20 and undercuts 25 to disconnect adjacent auxiliary side ramps 40a, 40b. This tool 30 has two vertical rods 32 designed to be inserted into corresponding slots 20 in the top of an auxiliary side ramp 40. Horizontal protrusions 35 at the lower ends of the vertical rods 32 removably engage the undercuts 25 in the auxiliary side ramp as depicted in FIG. 14. In particular, the user initially inserts the rods 32 of the tool 30 vertically downward into the slots 20 in the top of the auxiliary side ramp. The horizontal protrusions 35 can be made to engage the undercuts 25 in the slots 20 either by slightly pivoting the upper end of the tool 30, or shifting the entire tool 30 slightly forward in the slots 20 toward the undercuts 25, so that the horizontal protrusions 35 extend into the undercuts 25 and also catch under the undercuts 25. The user then exerts an upward force on the tool 30 to lift the auxiliary side ramp 40d and disconnect its edge connectors 46 from those of the adjacent auxiliary side ramp 40c. This also serves to disengage the auxiliary side ramp from the underlying cable protector 10 and bottom connectors 50.

It should be noted that the size, shape and proportions of these slots 20 and undercuts 25 are largely a matter of design choice. It should also be understood that the terms "slot" and "undercut" should be broadly construed. A relatively narrow slot offers the advantages of being visually unobtrusive, minimizing the risk of being a trip hazard, and minimizing the risk of the slot becoming obstructed with dirt or debris. However, the slots 20 could have a wide range of shapes, dimensions and proportions. For example, the slots 20 could be rectangular, square, circular, tapered or oval. Also, the slots 20 can have any desired orientation with respect to the auxiliary side ramp 40. Similarly the undercuts 25 can have any desired shape, dimensions and proportions. Each slot can be provided with multiple undercuts 25 allowing the tool 30 to be inserted in more than one orientation. For example, the slot 20 could be a round hole or recess with an annular peripheral undercut extending outward about the lower end of the hole.

The locations of the slots 20 and undercuts 25 on the auxiliary side ramp 40 are also largely a matter of design choice. For example, FIGS. 15-17 show the slots 20 on the male edge connectors 46. FIGS. 18-23 show the slots 20 adjacent to the heads of the female edge connectors 48. In contrast, FIGS. 24-26 show the slots 20 on the distal ends of the male edge connectors 46. Alternatively, the slots 20 could be located on edges of the auxiliary side ramp 40 adjacent to its edge connectors 46 or 48.

In particular, FIGS. 1, 2, 6-11 and 13-14 show an embodiment in which the slots 20 extend up to the head of the female edge connectors 48 of each auxiliary side ramp 40, and the corresponding undercuts 25 extend into the male edge connectors 46 of the adjacent auxiliary side ramp. These undercuts 25 align with the slots 20 when the auxiliary side ramps 40a, 40b and 40c, 40d are assembled. Insertion of the tool 30 into the slots 20 in an auxiliary side ram 40c causes its horizontal protrusions 35 to extend into the undercuts 25 in the adjacent auxiliary side ramp 40d, as shown in FIGS. 13 and 14. The auxiliary side ramps 40c and 40d can then be disengaged by lifting upward on the tool 30. Similarly, the locations of the slots 20 and undercuts 25 could be reversed, so that the slots 20 extend to the ends of the male edge connectors 46 of a first auxiliary side ramp and the undercuts 25 extend into the female edge connectors 48 of a second auxiliary side ramp. Alternatively, the slots 20 and undercuts 25 could span across two adjacent auxiliary side ramps at other locations along the edges of the auxiliary side ramps.

The slots 20 and undercuts 25 could also be located in various areas of the body of the auxiliary side ramp further from the edge connectors 46, 48, although these configurations might make it more difficult to disengage the edge connectors 46, 48 due to torsion created by exerting a vertical upward force on the tool 30 at a distance from the edge connectors 46, 48.

It should be noted that the slots 20 in the embodiments depicted in FIGS. 15-17, 21-23 and 27-29 are each equipped with two undercuts 25a, 25b extending in opposite directions, similar to those shown in the earlier figures. This allows the tool 30 to be inserted in either of two possible orientations. FIGS. 21-23 show these slots 20 positioned near the head of the female edge connectors 48. In contrast, FIGS. 15-17 shows the slots 20 located near the base of the male connectors 46 in the auxiliary side ramp 40a. FIGS. 27-29 illustrate yet another embodiment in which the slots are located further from the heads of the female edge connectors 48.

In the embodiment shown in FIGS. 21-23, one undercut extends into the male edge connector 46 of the adjacent auxiliary side ramp 40d, while the second undercut extends in the opposite direction into auxiliary side ramp 40c (FIG. 23). This allows the user to select which auxiliary side ramp 40c or 40d will be lifted upward by the vertical force exerted by the tool 30. For example, if the user is disengaging a string of auxiliary side ramps from left to right in FIG. 2, the user may wish to stand on the left auxiliary side ramp 40c (as an anchoring weight) and insert the tool 30 so that its horizontal protrusions 35 exert an upward force on the undercuts 25 in the right auxiliary side ramp 40d to thereby disengage these auxiliary side ramps. The user can then easily repeat this process on any successive auxiliary side ramps to the right of the auxiliary side ramp 40d. A similar process can be employed working right-to-left by reversing the direction of the tool 30 and using the second undercut extending under the auxiliary side ramp 40c.

FIGS. 30-49 show several alternative embodiments of the present invention having other types of tool engagement features. FIG. 30-32 show an embodiment in which the undercut is a pin 26 extending across the slot 20. FIGS. 33-34 show an embodiment with raised tool engagement features 27 located on the top surfaces of the male edge connectors 46. In this embodiment, the tool 30 has horizontal projections that are inserted through these raised features 27 to removably engage the auxiliary side ramp.

Figure 35:
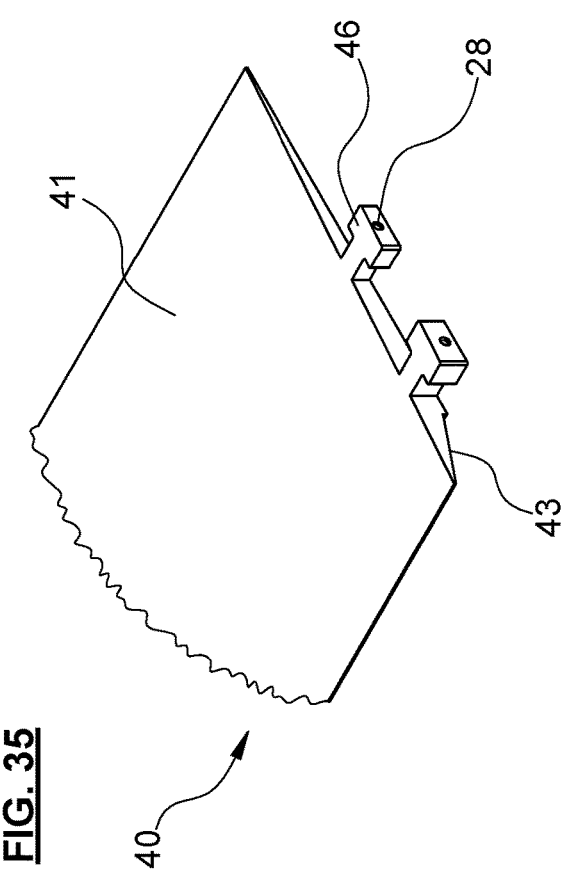
FIG. 35 is a top axonometric detail view of an auxiliary side ramp 40 with holes 28 in the distal ends of the male edge connectors 46.
Figure 36:
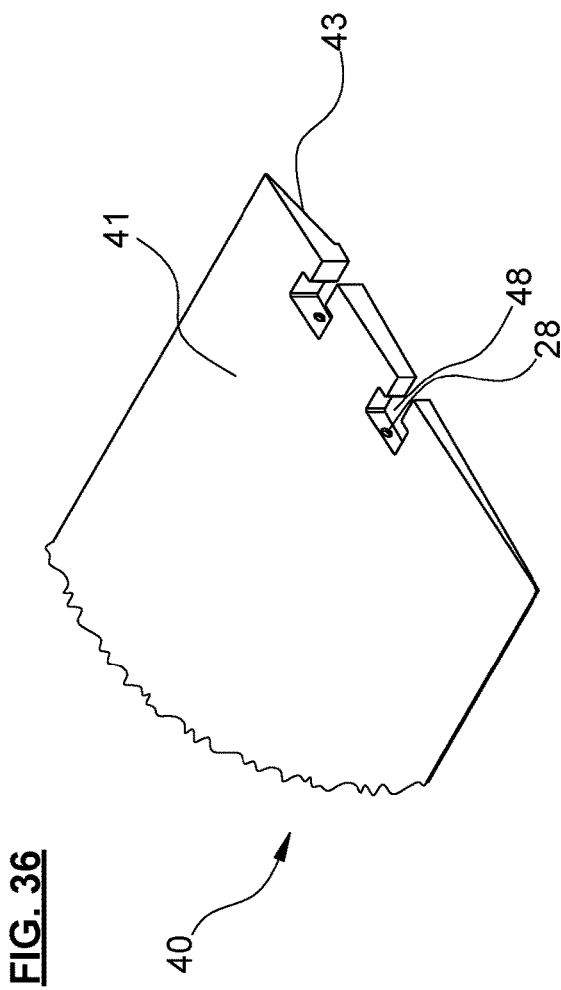
FIG. 36 is a top axonometric detail view of an auxiliary side ramp 40 with holes 28 in the ends of the female edge connectors 48.
Figure 40:
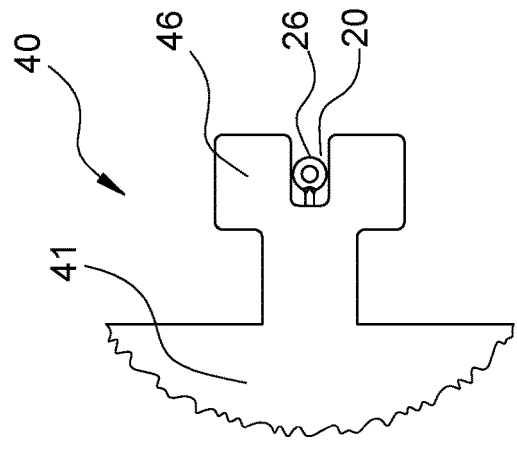
FIG. 40 is a detail top view similar to FIG. 39 with a tool engagement feature 26 in the form of an eyebolt embedded in a recess 20 in a male edge connector 46.
Figure 39:
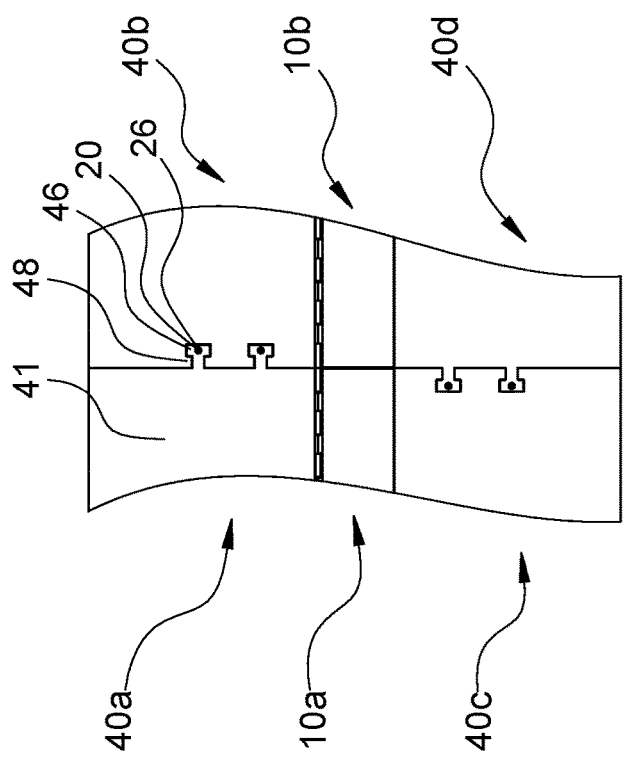
FIG. 39 is a detail top view of four assembled auxiliary side ramps 40a-40d with tool engagement features 26 in the form of eyebolts mounted horizontally in recesses in the male edge connectors 46.
Figure 42:
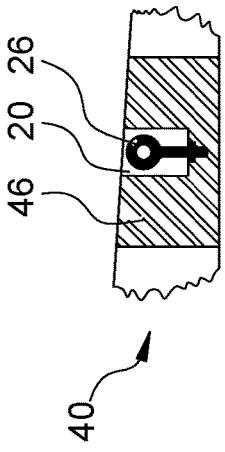
FIG. 42 is a vertical cross-sectional view similar to FIG. 40 of a male edge connector 46 with a tool engagement feature 26 in the form of an eyebolt mounted vertically in the recesses 20 in the male edge connector 46.
Figure 41:
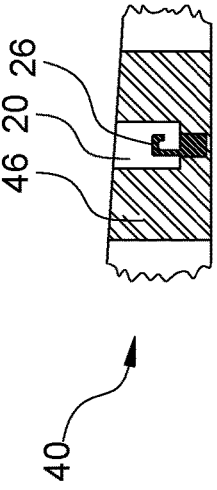
FIG. 41 is a vertical cross-sectional view of a male edge connector 46 with a tool engagement feature 26 in the form of a recessed hook.
Figure 43:
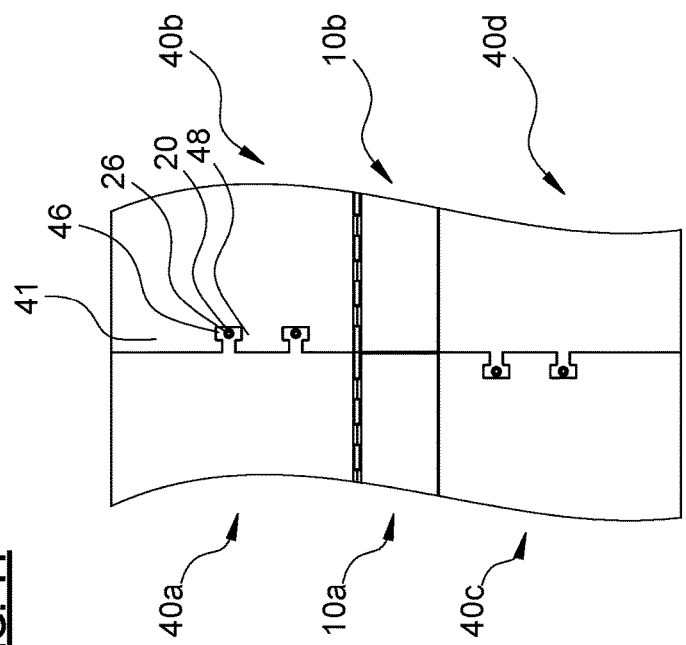
FIG. 43 is a detail top view of four assembled auxiliary side ramps 40a-40d with tool engagement features 26 in the form of threaded inserts in the male edge connectors 46.
Figure 44:
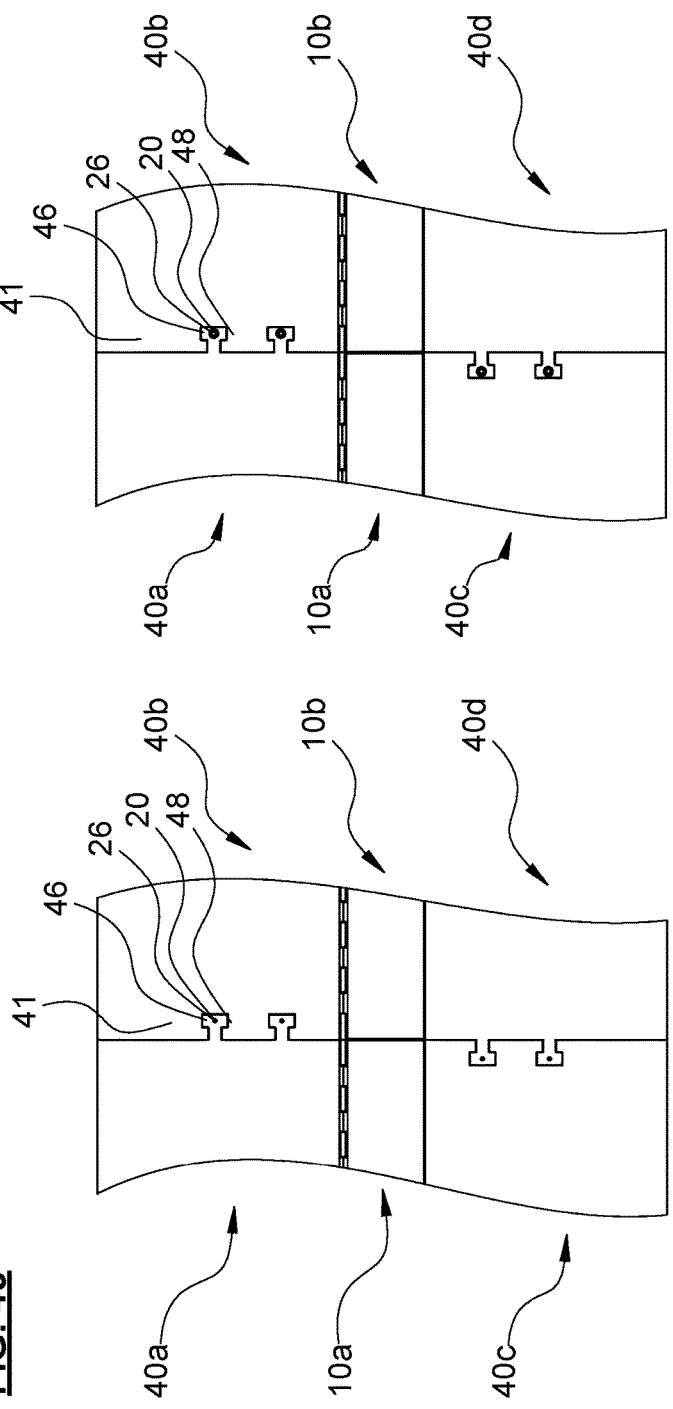
FIG. 44 is a detail top view of four assembled auxiliary side ramps 40a-40d similar to FIG. 43 with an alternative form of threaded inserts 26.
Figure 45:
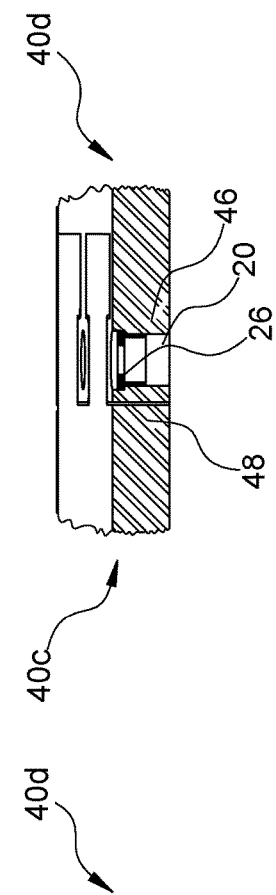
FIG. 45 is a vertical cross-sectional view corresponding to FIG. 43.
Figure 46:
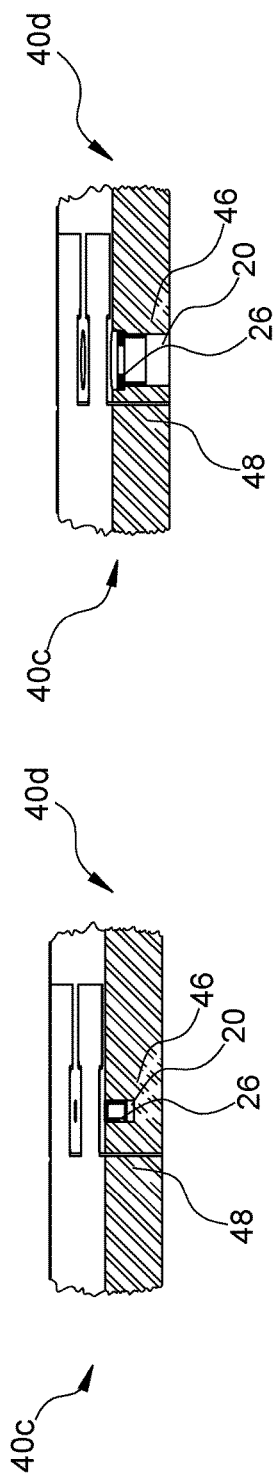
FIG. 46 is a vertical cross-sectional view corresponding to FIG. 44.

FIG. 35 illustrates an embodiment with holes 28 in the distal ends of the male edge connectors 46 as the tool engagement features to receive corresponding horizontal protrusions 35 extending from the lower end of the tool 30. FIG. 36 depicts an embodiment with similar holes 28 in the ends of the female edge connectors 48

FIGS. 37-38 show an embodiment with angled holes 29 in the male edge connectors 46 to accommodate corresponding angled projections extending from the lower end of the tool 30.

FIGS. 39-42 illustrate alternative embodiments of the present invention using eyebolts or recessed hooks as the tool engagement features 26. These tool engagement features can be mounted in recesses 20 in the male edge connectors 46 of the auxiliary side ramp, as shown for example in FIGS. 40-42, or embedded in the top surface 41 of the auxiliary side ramp.

FIGS. 43-46 show two alternative embodiments of the present invention using threaded inserts as the tool engagement features 26. These threaded inserts 26 extend into the male edge connector 46 of the auxiliary side ramp. In these embodiments, the tool 30 has a threaded lower end that can be threaded into the threaded inserts 26 by a quick twisting motion (e.g., a quarter turn) to removably engage the tool 30 to the auxiliary side ramp.

FIGS. 47-48 show an embodiment of the present invention in which the tool engagement features are holes 28 in the top surface of the auxiliary side ramp. The lower ends of the tool 30 are slightly larger than the holes 28 and engage these holes 28 by a friction fit. The lower ends of the tool 30 are initially pushed the holes 28 to establish a connection. The user can then lift upward on tool 30 to disengage the edge connectors 16 from the adjacent auxiliary side ramp 40b. Frictional engagement between the tool 30 and holes 28 can be maximized by lifting upward on the tool 30 with a slightly off-vertical force vector.

FIG. 49 shows another embodiment in which the lower end of the tool 30 is initially inserted in a hole 28 in the auxiliary side ramp 40c. The user can then manually cause the lower end of the tool 30 to expand radially outward to removably engage the hole 28.

FIGS. 50-55 illustrate two embodiments of the present invention intended for use in auxiliary side ramps 40a, 40b having "hidden" edge connectors 46, 48. In these embodiments, the male edge connectors 46 have a reduced height that does not extend to the top surface of the auxiliary side ramp 40a. Similarly, the corresponding female connectors 48 do not extend completely through the auxiliary side ramp 40b to its top surface, but rather the female edge connectors 48 are formed as recesses in the bottom of the auxiliary side ramp 40b adjacent to its end. In this configuration, both sets of edge connectors 46, 48 are concealed when the auxiliary side ramps 40a, 40b are connected as shown in FIG. 50.

In the embodiment shown in FIGS. 50-52, a slot 20 extends downward from the top surface of the auxiliary side ramp 40a in vertical alignment with the hidden edge connectors 46, 48 below. An undercut 25 at the bottom of the slot 20 is used to engage the horizontal protrusion 35 on the lower end of the tool 30 as previously discussed. Alternatively, the slot 20 could be shifted out of vertical alignment with the male edge connector 46. In this embodiment, the lower end of the tool 30 is inserted into the slot 20 and undercut 25 as previously discussed to enable the user to exert an upward force on the auxiliary side ramp 40a. Here again, the edge connectors 46, 48 remain completely hidden while the auxiliary side ramps 40a, 40b are connected together.

Figure 53:
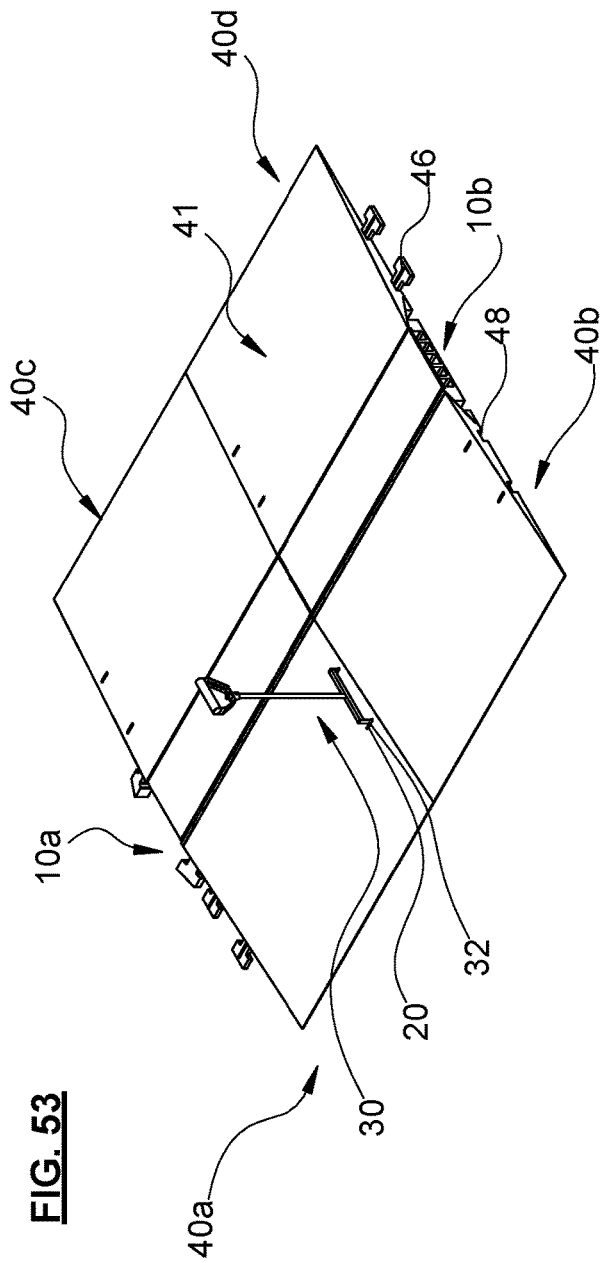
FIG. 53 is a top axonometric view of auxiliary side ramps 40a-40d having of another embodiment of the hidden edge connectors 46, 48 in which the slot 20 extends downward through the male edge connector 46.
Figure 55:
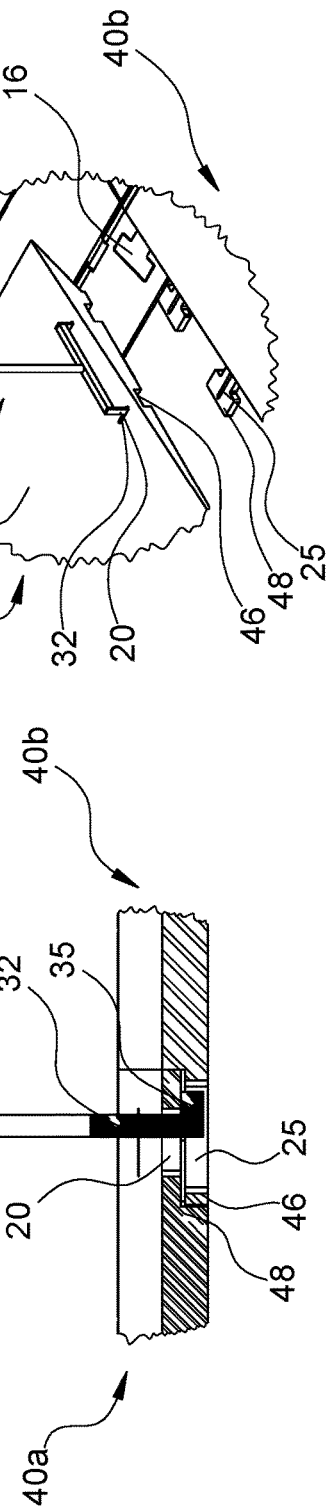
FIG. 55 is a detail axonometric view corresponding to FIGS. 53-54 showing the auxiliary side ramps 40a, 40b after the hidden edge connectors 46, 48 have been disengaged.
Figure 54:
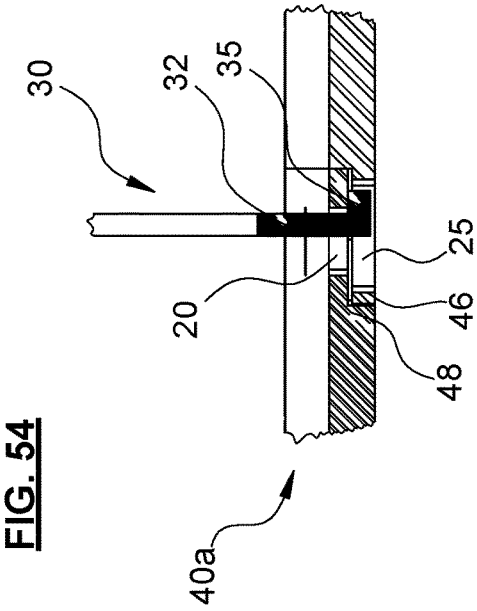
FIG. 54 is a detail vertical cross-sectional view corresponding to FIG. 53 showing the hidden edge connectors 46, 48 and tool 30.

FIGS. 53-55 show another embodiment of the present invention in which the slots 20 extend downward from the top surface 41 of the auxiliary side ramp 40, and also extend through the hidden male edge connectors 46 beneath. The lip of the slot 20 where it meets the edge of female edge connector 48 forms an undercut for engaging the horizontal protrusions 35 on the lower end of the tool 30, as shown in FIG. 54. This approach allows the wall of the auxiliary side ramp 40 above the female edge connector 48 to have a greater thickness, and thereby enhances the strength and rigidity of the structure. Alternatively, the lower portion of the slot 20 could extend only partially into the male edge connector 46. Also, the lower portion of the slot 20 could extend through the end of the male edge connector 46.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A disconnect system comprising:
    a plurality of modular cable protectors, each having:
        a body having an upper surface with opposing side ramps, and opposing ends;
        at least one channel extending in parallel between the ends; and
        end connectors on the ends for connecting a plurality of like cable protectors in series with the channels in alignment with the channels of adjacent cable protectors;
    an auxiliary side ramps for removably overlaying the side ramp of at least one cable protector, said auxiliary side ramp having:
        a sloped top surface forming a ramp over the side ramp of at least one cable protector, and having opposing first and second ends; and
        a tool engagement feature in the top surface of the auxiliary side ramp having an opening in the top surface of the auxiliary side ramp and an undercut extending horizontally from the opening within the auxiliary side ramp; and
    a tool having:
        a lower end for removably engaging the undercut of the tool engagement feature of an auxiliary side ramp; and
        a vertical member being removably received by the opening in the top surface of an auxiliary side ramp, said vertical member extending upward from the lower end to enable an upward force on the tool to be exerted on the tool engagement feature to lift the auxiliary side ramp and thereby disengage the auxiliary side ramp from the cable protector.

2. The disconnect system of claim 1 wherein the auxiliary side ramp further comprises sets of end connectors on the first and second ends for removably engaging complementary end connectors on adjacent like auxiliary side ramps.

3. The disconnect system of claim 2 wherein the tool engagement feature is adjacent to an end connector of the auxiliary side ramp.

4. The disconnect system of claim 2 wherein the end connectors of the auxiliary side ramp comprise complementary sets of male and female end connectors on the first and second ends of the auxiliary side ramp, and the tool engagement feature is on a male end connector.

5. The disconnect system of claim 2 wherein the end connectors of the auxiliary side ramp comprise complementary sets of male and female end connectors on the first and second ends of the auxiliary side ramp, and the tool engagement feature is adjacent to a female end connector.

6. The disconnect system of claim 1 wherein the opening further comprises a substantially vertical slot.

7. The disconnect system of claim 1 wherein the end connectors of the auxiliary side ramp further comprise complementary sets of male and female end connectors on the first and second ends of the auxiliary side ramp, and wherein the opening extends into a male end connector on the first end and the undercut extends into a female end connector on the second end.

8. The disconnect system of claim 1 wherein the end connectors of the auxiliary side ramp further comprise complementary sets of male and female end connectors on the first and second ends of the auxiliary side ramp, and wherein the opening extends downward along a female end connector on the first end and the undercut extends into a male end connector on the second end.

9. The disconnect system of claim 1 wherein the lower end of the tool further comprises a horizontal protrusion for removably engaging the undercut.

10. An auxiliary side ramp for use with a modular cable protector having opposing side ramps and at least one channel extending in parallel between opposing ends of the cable protector; and a tool having a vertical member and a horizontal protrusion extending from the lower end of the vertical member; said auxiliary side ramp comprising:
    a sloped top surface forming a ramp over the side ramp of a cable protector, and having opposing first and second ends; and
    an opening extending downward from the top surface for removably receiving the lower end of the vertical member of a tool;
    an undercut extending horizontally from the opening beneath the top surface for removably engaging the horizontal protrusion of a tool inserted into the opening; said vertical member of the tool extending upward from the opening to enable an upward force on the tool to be exerted by the horizontal protrusion to lift the auxiliary side ramp and thereby disengage the auxiliary side ramp from the cable protector.

11. The auxiliary side ramp of claim 10 wherein the opening further comprises a substantially vertical slot.

12. The auxiliary side ramp of claim 10 wherein the auxiliary side ramp further comprises sets of end connectors on the first and second ends for removably engaging complementary end connectors on adjacent like auxiliary side ramps.

13. The auxiliary side ramp of claim 12 wherein the opening is adjacent to an end connector of the auxiliary side ramp.

14. The auxiliary side ramp of claim 12 wherein the end connectors of the auxiliary side ramp comprise complementary sets of male and female end connectors, and the opening is on a male end connector.

15. The auxiliary side ramp of claim 12 wherein the end connectors of the auxiliary side ramp comprise complementary sets of male and female end connectors, and the opening is adjacent to a female end connector.

16. The auxiliary side ramp of claim 12 wherein the end connectors of the auxiliary side ramp further comprise complementary sets of male and female end connectors on the first and second ends of the auxiliary side ramp, and wherein the opening extends into a male end connector on the first end and the undercut extends into a female end connector on the second end.

17. The auxiliary side ramp of claim 12 wherein the end connectors of the auxiliary side ramp further comprise complementary sets of male and female end connectors on the first and second ends of the auxiliary side ramp, and wherein the opening extends downward along a female end connector on the first end and the undercut extends into a male end connector on the second end.

\* \* \* \* \*